(12) United States Patent
Ham et al.

(10) Patent No.: US 9,881,494 B2
(45) Date of Patent: Jan. 30, 2018

(54) REMOTE CONTROLLER CAPABLE OF REMOTELY CONTROLLING PLURALITY OF DEVICES

(71) Applicant: LG ELECTRONICS INC., Seoul (KR)

(72) Inventors: Junseok Ham, Seoul (KR); Jaeyoung Kim, Seoul (KR); Yoonho Shin, Seoul (KR); Yoonseong Kim, Seoul (KR); Heejeong Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/280,676

(22) Filed: Sep. 29, 2016

(65) Prior Publication Data
US 2017/0092116 A1    Mar. 30, 2017

(30) Foreign Application Priority Data

Sep. 30, 2015  (KR) ........................ 10-2015-0138014

(51) Int. Cl.
G08C 19/16    (2006.01)
G08C 17/02    (2006.01)
(Continued)

(52) U.S. Cl.
CPC ........... *G08C 17/02* (2013.01); *G06F 3/0304* (2013.01); *G06F 3/0346* (2013.01);
(Continued)

(58) Field of Classification Search
CPC .. G06F 3/0304; G06F 3/0346; G06F 3/03542; G06F 3/0383; G06F 3/0425;
(Continued)

(56) References Cited

U.S. PATENT DOCUMENTS

2002/0024518 A1*  2/2002  Murata ................. G06F 3/1454
                                                345/440
2007/0265717 A1* 11/2007  Chang .................. G06F 1/1626
                                                700/83
(Continued)

FOREIGN PATENT DOCUMENTS

EP    1 021 035    7/2000
EP    2 528 351    11/2012

OTHER PUBLICATIONS

European Search Report dated Feb. 10, 2017 issued in Application No. 16191618.4.

*Primary Examiner* — Ojiako Nwugo
(74) *Attorney, Agent, or Firm* — KED & Associates, LLP

(57) ABSTRACT

Disclosed herein is a remote controller capable of remotely controlling a plurality of devices. According to one embodiment of the present invention, the remote controller includes a transmitter to transmit a transmitting signal, a receiver to receive a reflective signal from a first reflection pattern, an image projector to project an image outward, an input unit provided with a plurality of buttons, and a controller to perform a control operation to enter a remote control mode for a first device corresponding to the first reflection pattern based on the reflective signal from the first reflection pattern and to perform a control operation to project a remote control window for remote control of the first device outward through the image projector. Thereby, remote control may be performed based on image projection.

20 Claims, 22 Drawing Sheets

(51) Int. Cl.
*G06F 3/03* (2006.01)
*G06F 3/0346* (2013.01)
*G06F 3/0354* (2013.01)
*G06F 3/038* (2013.01)
*G08C 17/00* (2006.01)
*H04N 5/44* (2011.01)
*G06F 3/042* (2006.01)

(52) U.S. Cl.
CPC ........ *G06F 3/0383* (2013.01); *G06F 3/03542* (2013.01); *G08C 17/00* (2013.01); *G06F 3/0425* (2013.01); *G08C 2201/30* (2013.01); *G08C 2201/70* (2013.01); *G08C 2201/92* (2013.01); *H04N 5/4403* (2013.01); *H04N 2005/4408* (2013.01)

(58) Field of Classification Search
CPC .... G08C 17/00; G08C 17/02; G08C 2201/30; G08C 2201/70; G08C 2201/92; H04N 2005/4408; H04N 5/4403
See application file for complete search history.

(56) References Cited

U.S. PATENT DOCUMENTS

| | | | |
|---|---|---|---|
| 2011/0043372 A1* | 2/2011 | Ohki | H04N 5/4403 340/4.3 |
| 2012/0139689 A1 | 6/2012 | Nakade et al. | |
| 2012/0280948 A1* | 11/2012 | Barrus | G06F 3/04883 345/179 |
| 2013/0249811 A1 | 9/2013 | Cao et al. | |
| 2014/0267623 A1* | 9/2014 | Bridges | G01S 17/003 348/46 |

\* cited by examiner

REMOTE CONTROLLER CAPABLE OF REMOTELY CONTROLLING PLURALITY OF DEVICES

CROSS-REFERENCE TO RELATED APPLICATION

This application claims the priority benefit of Korean Patent Application No. 10-2015-0138014, filed on Sep. 30, 2015 in the Korean Intellectual Property Office, the disclosure of which is incorporated herein by reference.

BACKGROUND OF THE INVENTION

1. Field of the Invention

The present invention relates to a remote controller capable of performing a remote control operation based on image projection.

2. Description of the Related Art

A remote controller is used to remotely control a TV, an air conditioner, an optical disc player, and the like.

To remotely control respective electronic devices, a TV remote controller, an air conditioner remote controller and an optical disc player remote controller, which are assigned different control codes, are used.

The number of electronic devices employing remote controllers is increasing to enhance user convenience. However, if separate remote controllers for the respective electric devices are used, this may cause inconvenience to the users. Accordingly, attempts have been made to address such inconvenience.

SUMMARY OF THE INVENTION

Therefore, the present invention has been made in view of the above problem, and it is an object of the present invention to provide a remote controller capable of performing remote control based on image projection.

Another object of the present invention is to provide a remote controller capable of outputting images based on image projection.

A further object of the present invention is to provide a remote controller capable of remotely controlling a plurality of devices.

In accordance with an aspect of the present invention, the above and other objects can be accomplished by the provision of a remote controller including a transmitter to transmit a transmitting signal, a receiver to receive a reflective signal from a first reflection pattern, an image projector to project an image outward, an input unit provided with a plurality of buttons, and a controller to perform a control operation to enter a remote control mode for a first device corresponding to the first reflection pattern based on the reflective signal from the first reflection pattern and to perform a control operation to project a remote control window for remote control of the first device outward through the image projector.

In accordance with another aspect of the present invention, there is provided a remote controller including a transmitter to transmit a transmitting signal, a receiver to receive a reflective signal from a first reflection pattern, an image projector to project an image outward, an input unit provided with a plurality of buttons, and a controller for performing a control operation to project an image related to the first reflection pattern outward based on the reflective signal from the first reflection pattern.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinguished meanings or functions. Accordingly, the terms "module" and "unit" may be interchangeably used.

Figure 1:
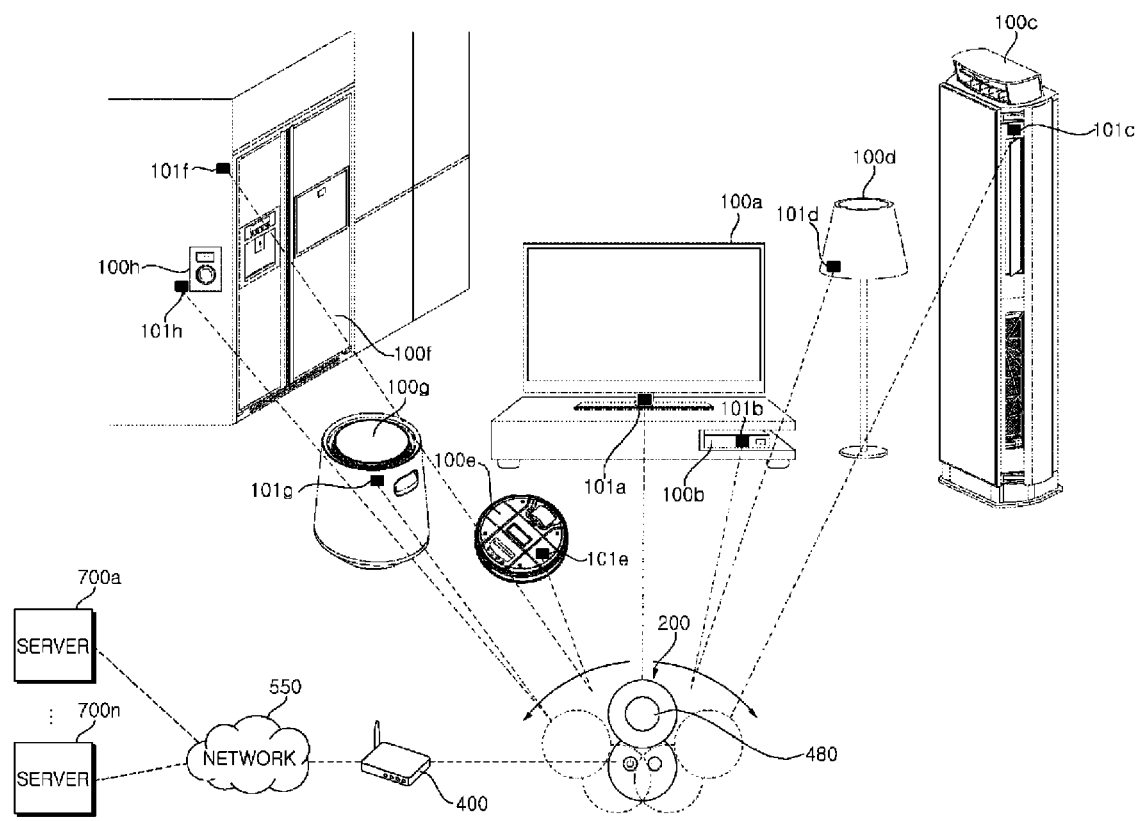
FIG. 1 is a view illustrating a device remote control system according to an embodiment of the present invention.

FIG. 1 is a view illustrating a device remote control system according to an embodiment of the present invention.

Referring to FIG. 1, a device remote control system 10 according to an embodiment of the present invention may include a remote controller 200, a plurality of devices 100a, 100b, 100c, 100d, 100e, 100f, 100g, and 100h, reflection patterns 101a, 101b, 101c, 101d, 101e, 101f, 101g and 101h disposed inside or around the respective devices.

The device remote control system 10 may further include a gateway 400 and servers 700a, . . . , 700n.

FIG. 1 shows an image display device 100a such as TV, a set-top box 100b, an air conditioner 100c, a lighting device 100d, a robot cleaner 100e, a refrigerator 100f, an air cleaner 100g, a thermostat 100h as examples of the devices. There may be various other examples of the devices. The devices shown in FIG. 1 may be referred to as home devices.

Examples of the devices may further include a washing machine, an optical disc player, a gaming device, a gas valve, a security device such as a security camera, a door that is electronically opened and closed, a window that is electronically opened and closed, a sound output device, a gaming device, an electronic picture frame, an energy storage system (ESS), a digital camera, a perfume generator, a vehicle, and a drone.

Hereinafter, description will be given focusing on the devices shown in FIG. 1.

The reflection patterns 101a, 101b, 101c, 101d, 101e, 101f, 101g and 101h may reflect a transmitting signal output from the remote controller 200 directed to the reflection patterns.

That is, the respective reflection patterns 101a, 101b, 101c, 101d, 101e, 101f, 101g and 101h may use a transmitting signal output from the remote controller 200 to output reflective signals corresponding to the reflection patterns.

The remote controller 200 may identify devices based on the reflective signals from the reflection patterns 101a, 101b, 101c, 101d, 101e, 101f, 101g and 101h, particularly according to a reflection pattern based on a reflective signal.

A reflective signal or a reflection pattern may include at least one of device type information, manufacturer information, device model name information, device status information, and information related to a device control command.

The device status information may include an On/Off state of the device, and an operation status value for an operation of the device.

The transmitting signal may be a signal having good directionality and may be one of an infrared signal, a radio frequency (RF) signal, a Wi-Fi signal, a ZigBee signal, a Bluetooth signal, a laser signal, and an ultra wideband (UWB) signal.

The remote controller 200 may receive a plurality of reflective signals from the reflection patterns 101a, 101b, 101c, 101d, 101e, 101f, 101g and 101h.

In this case, if the remote controller 200 is oriented toward one of the devices 100a, 100b, 100c, 100d, 100e, 100f, 100g, and 100h or one of the reflection patterns 101a, 101b, 101c, 101d, 101e, 101f, 101g and 101h, the remote controller 200 may detect one of at least one received reflective signal as a representative reflective signal.

Then, the remote controller 200 may perform signal processing on the detected reflective signal or the representative reflective signal, and recognize or identify a device corresponding to the reflective signal based on at least one of device type information, manufacturer information, device model name information, device status information, and information related to a device control command.

Alternatively, the remote controller 200 may recognize or identify a device by comparing the detected reflective signal or representative reflective signal with reflective signal-related data pre-stored in the remote controller 200.

Then, the remote controller 200 may project a remote control window for remotely controlling the recognized device. Particularly, the remote controller 200 may project the remote control window onto an area near the reflection pattern.

If an item in the remote control window is selected by a user after the remote control window for device control is projected outward, the remote controller 200 may output and transmit a signal corresponding to the selected item, namely a remote control signal.

For example, when the remote controller 200 is oriented toward the air conditioner 100c, the remote controller 200 controls the remote control window to be projected outward. If a first item which is set as an item for adjusting intensity of airflow from the air conditioner is selected from the remote control window, the remote controller 200 may output and transmit a remote control signal related to adjustment of the intensity of airflow from the air conditioner.

If the remote controller 200 is oriented toward a first device, the remote controller 200 may detect a first reflective signal from a first reflection pattern which is attached to correspond to the first device, and control a first remote control window for remote control of the first device to be projected outward based on the detected first reflective signal. If the remote controller 200 is oriented toward a second device, the remote controller 200 may detect a second received reflective signal, and control the second remote control window for remote control of the second device to be projected outward based on the detected second reflective signal.

Thereby, various devices can be remotely controlled by one remote controller 200.

That is, the image display device 100a such as a TV, the set-top box 100b, the air conditioner 100c, the lighting device 100d, the robot cleaner 100e, the refrigerator 100f, the air cleaner 100g, or the thermostat 100h may be remotely controlled according to the direction in which the remote controller 200 is oriented.

A remote control signal output from the remote controller 200 may be one of an infrared signal, a radio frequency (RF) signal, a Wi-Fi signal, a ZigBee signal, a Bluetooth signal, a laser signal, and an ultra wideband (UWB) signal.

The remote controller 200 may receive, from the gateway 400, control command information about at least one part of the remote control window for remote control of each device.

Alternatively, the remote controller 200 may transmit, to the gateway 400, control command information about at least one part of the remote control window for remote control of each device.

Particularly, the gateway 400 may receive control command information about at least one part of the remote control window for remote control of each device from the external servers 700a, . . . , 700n over a network 550.

The external servers 700a, . . . , 700n may be servers operated by the manufacturers of the respective devices or be servers for storing information about the respective devices.

Figure 2:
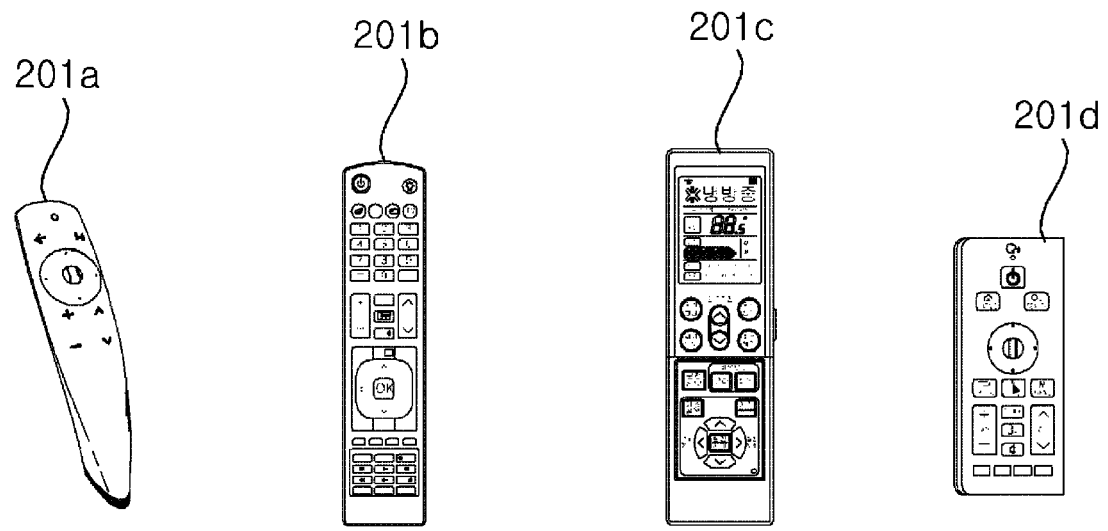
FIG. 2 is a view illustrating remote controllers for devices.

FIG. 2 is a view illustrating remote controllers for devices.

FIG. 2 exemplary shows a remote controller 201a for the display device, a remote controller 201b for an optical disc player, a remote controller 201c for the air conditioner and a remote controller 201d for the robot cleaner.

As shown in FIG. 2, if remote controllers assigned different codes are used to remotely control the respective electronic devices, the number of remote controllers may increase, thereby causing user inconvenience.

The present invention proposes a remote controller for remotely controlling a plurality of devices.

FIG. 3A to 3F are views illustrating variation among types of controlled devices according to a direction in which the remote controller of FIG. 1 is oriented.

Figure 3A:
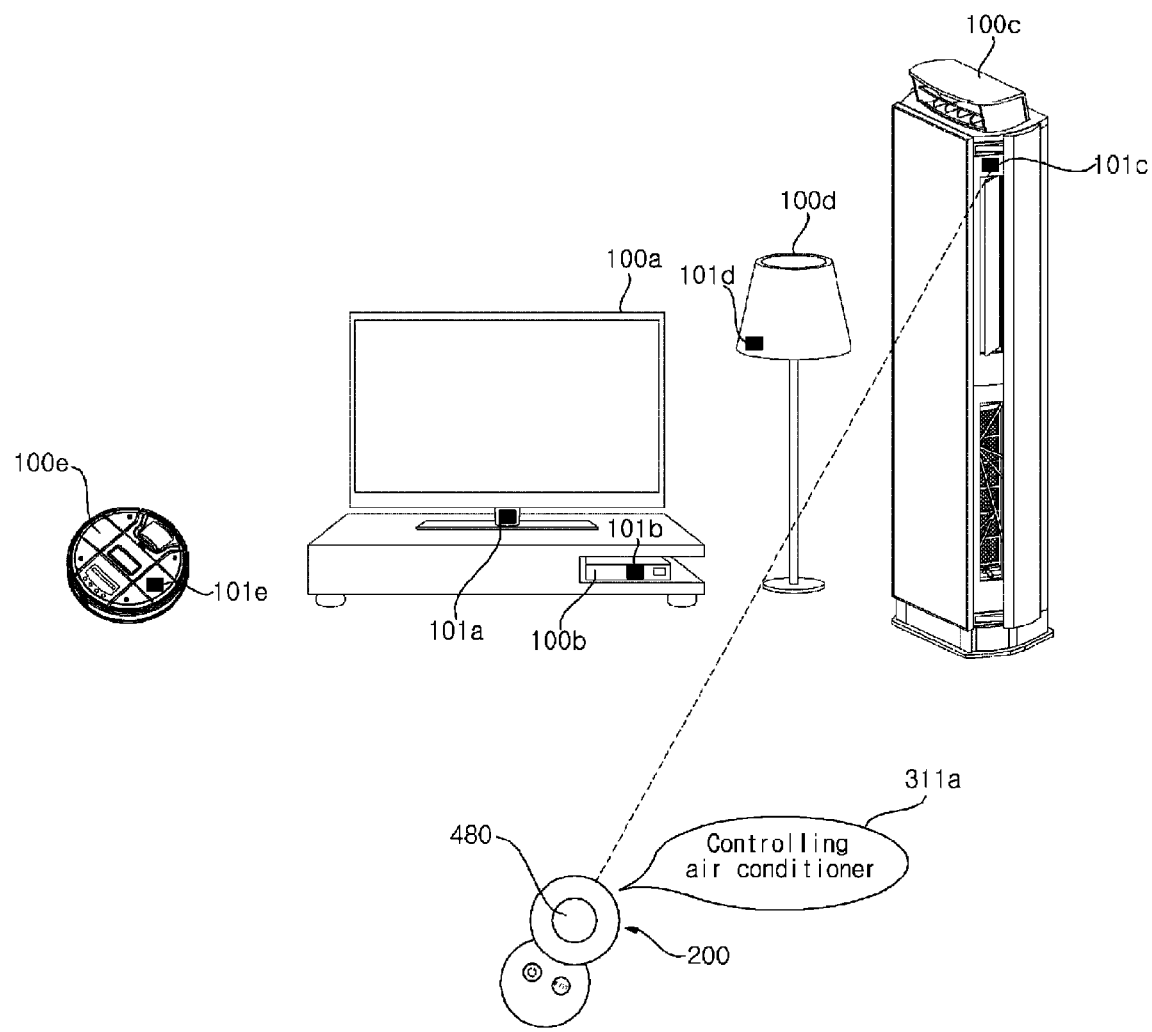
FIG. 3A to 3F are views illustrating variation among types of controlled devices according to a direction in which the remote controller of FIG. 1 is oriented.

FIG. 3A illustrate a case where the remote controller 200 is oriented toward the air conditioner 100c among various devices 100a, 100b, 100c, 100d, and 100e in the home.

The remote controller 200 receives at least one reflective signal including a reflective signal from the reflection pattern 101c corresponding to the air conditioner 100c. Then, the remote controller 200 may detect device identification information from the at least one received reflective signal, and may recognize or identify the air conditioner 100c as a remotely controllable device, based on the detected device identification information.

For example, if at least one of device type information, manufacturer information and device model name information is contained in the detected reflective signal, the remote controller 200 may perform signal processing on the reflective signal, and extract the at least one of device type information, manufacturer information and device model name information. The remote controller 200 may recognize or identify a device corresponding to the reflective signal based on the at least one of device type information, manufacturer information and device model name information.

As another example, if the reflective signal which is received and detected is a specific signal set to enable identification of a device, the remote controller 200 may compare the reflective signal with reflective signal-related data stored in the memory 465 to recognize or identify the device.

More specifically, if the reflective signal that is received and detected is a space-based pattern signal, the remote controller 200 may compare the received pattern signal with data related to the space-based pattern signal and stored in the memory 465 to recognize or identify the device.

After the remote controller 200 identifies the air conditioner 100c as the device toward which the remote controller 200 is oriented, the remote controller 200 may control a remote control window for the air conditioner 100c to be projected outward.

When device identification is completed or projection of the remote control window is completed, the remote controller 200 may output sound, cause an LED contained in the remote controller 200 to emit light for a predetermined time, or generate vibration to deliver a device control enabled message 311a, based on the detected reflective signal. Thereby, the user may recognize that the air conditioner can be controlled. In the example of FIG. 3A, the air conditioner control enabled message 311a such as "Controlling the air conditioner" is output in the form of sound.

Alternatively, in consideration of user convenience, a device which is identified or controllable by the remote controller 200 may turn on an LED contained in the device or a transmitter thereof for a predetermined time, make a specific sound through a sound output device included in the device or the transmitter, or provide, on a display included in the device or the transmitter, a message indicating that the device can be remotely controlled by the remote controller 200.

Particularly, if a predetermined item in the remote control window is selected after projection of the remote control window is completed, the remote controller 200 may transmit a remote control signal corresponding to a control command of the predetermined item to the air conditioner 100c.

After receiving the remote control signal, the air conditioner 100c may cause the LED installed in the air conditioner 100C to emit light for a predetermined time. Thereby, the user may recognize that the air conditioner is under control.

Figure 3B:
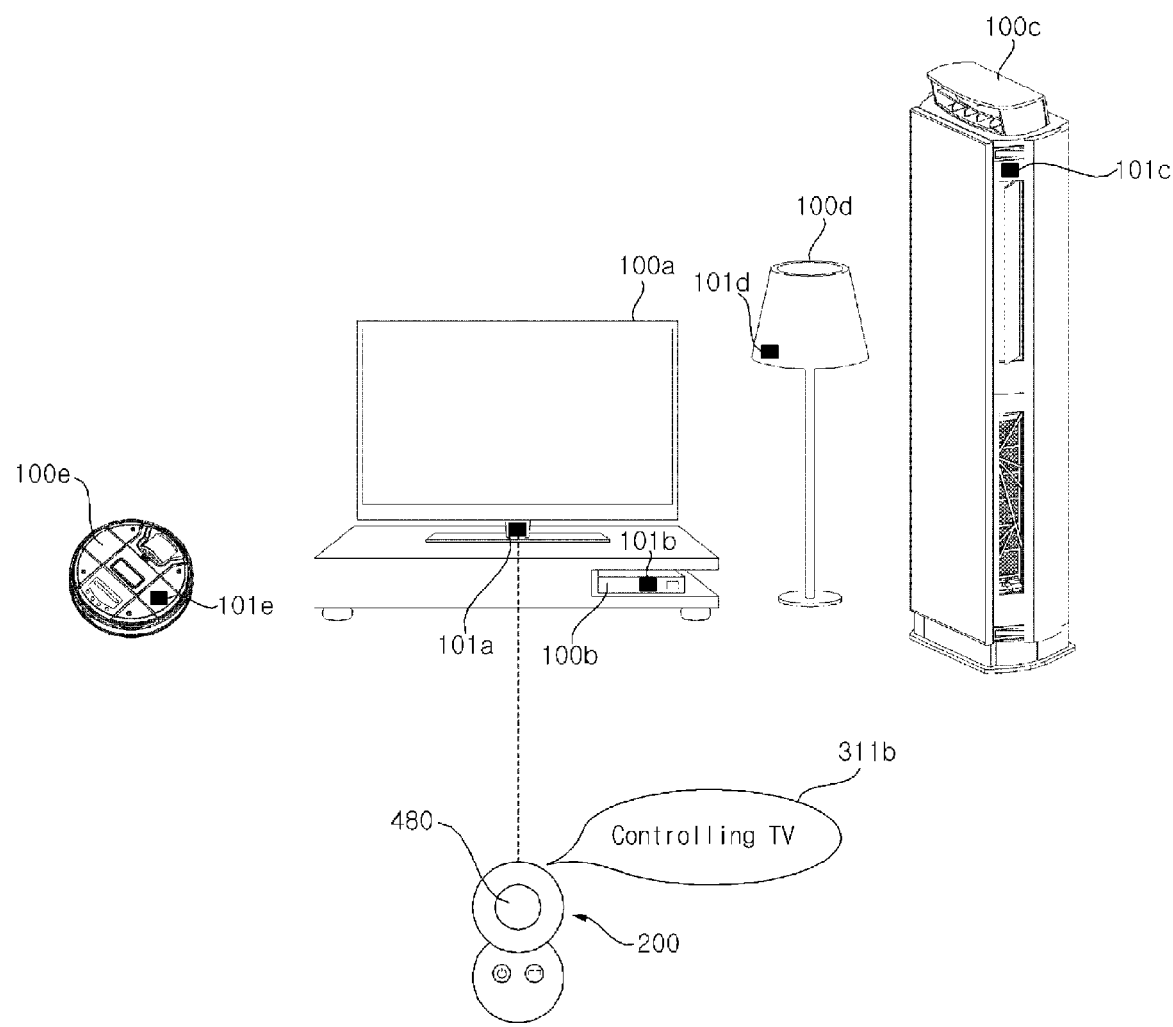

FIG. 3B illustrate a case where the remote controller 200 is oriented toward the image display device 100a among various devices 100a, 100b, 100c, 100d, and 100e in the home.

The remote controller 200 receives a reflective signal from the reflection pattern 101a corresponding to the image display device 100a.

Then, the remote controller 200 may detect device identification information from at least one reflective signal including the identification signal received from the image display device 100a, and may recognize or identify the image display device 100a as a remotely controllable device, based on the detected device identification information. For details of recognition of the image display device 100a, refer to the description of FIG. 3A.

After the remote controller 200 recognizes the image display device 100a as the device toward which the remote controller 200 is oriented, the remote controller 200 may control a remote control window for the image display device 100a to be projected outward.

Figure 3C:
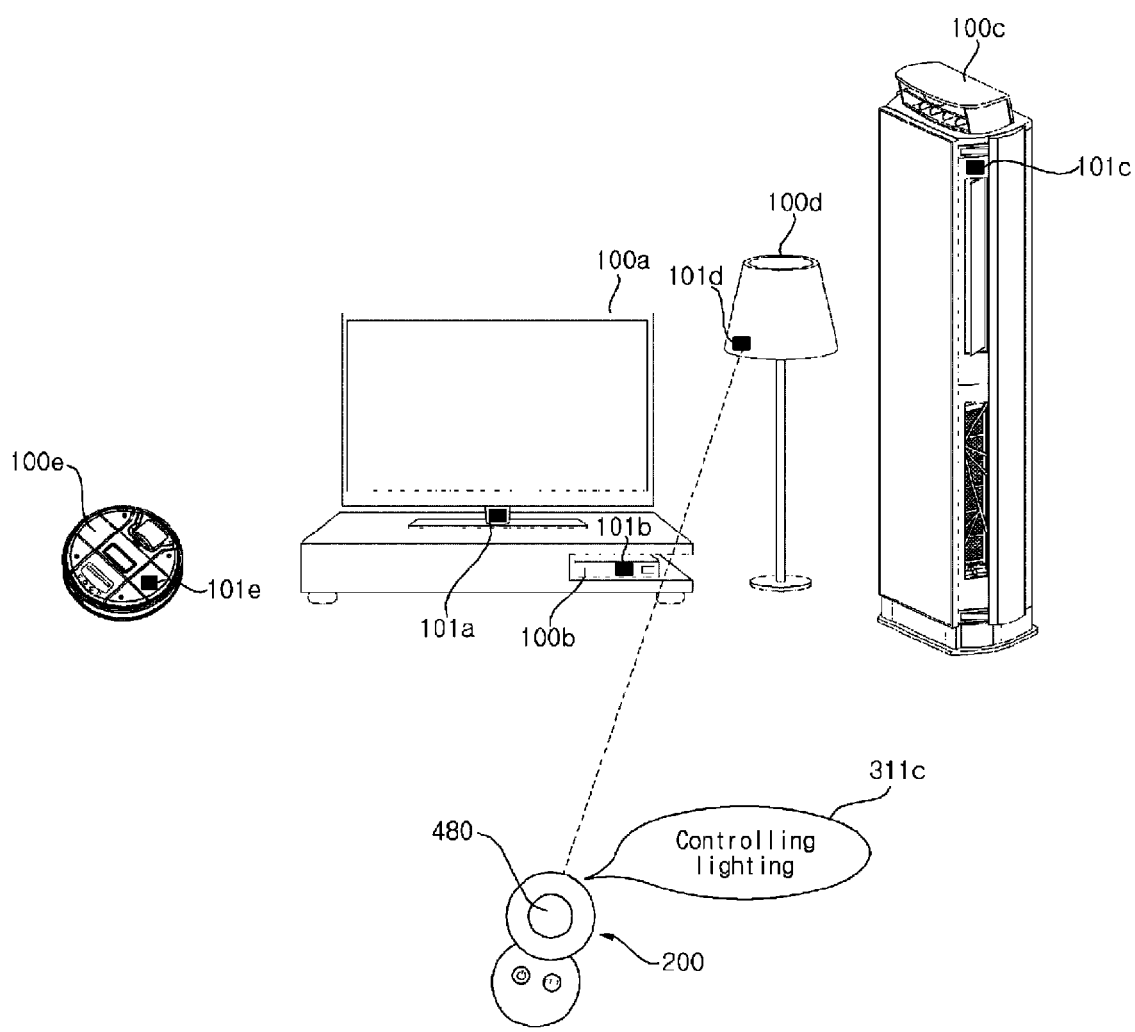

FIG. 3C illustrates a case where the remote controller 200 is oriented toward the lighting device 100d among various devices 100a, 100b, 100c, 100d, and 100e in the home.

The remote controller 200 receives a reflective signal, for example, an infrared (IR) signal from the reflection pattern 101d corresponding to the lighting device 100d.

Then, the remote controller 200 may recognize the lighting device 100d as a device toward which the remote controller 200 is oriented, based on the IR signal. For details of recognition of the lighting device 100d, refer to the description of FIG. 3A.

After the remote controller 200 recognizes the lighting device 100d as the device toward which the remote controller 200 is oriented, the remote controller 200 may control a remote control window for the lighting device 100d to be projected outward.

Figure 3D:
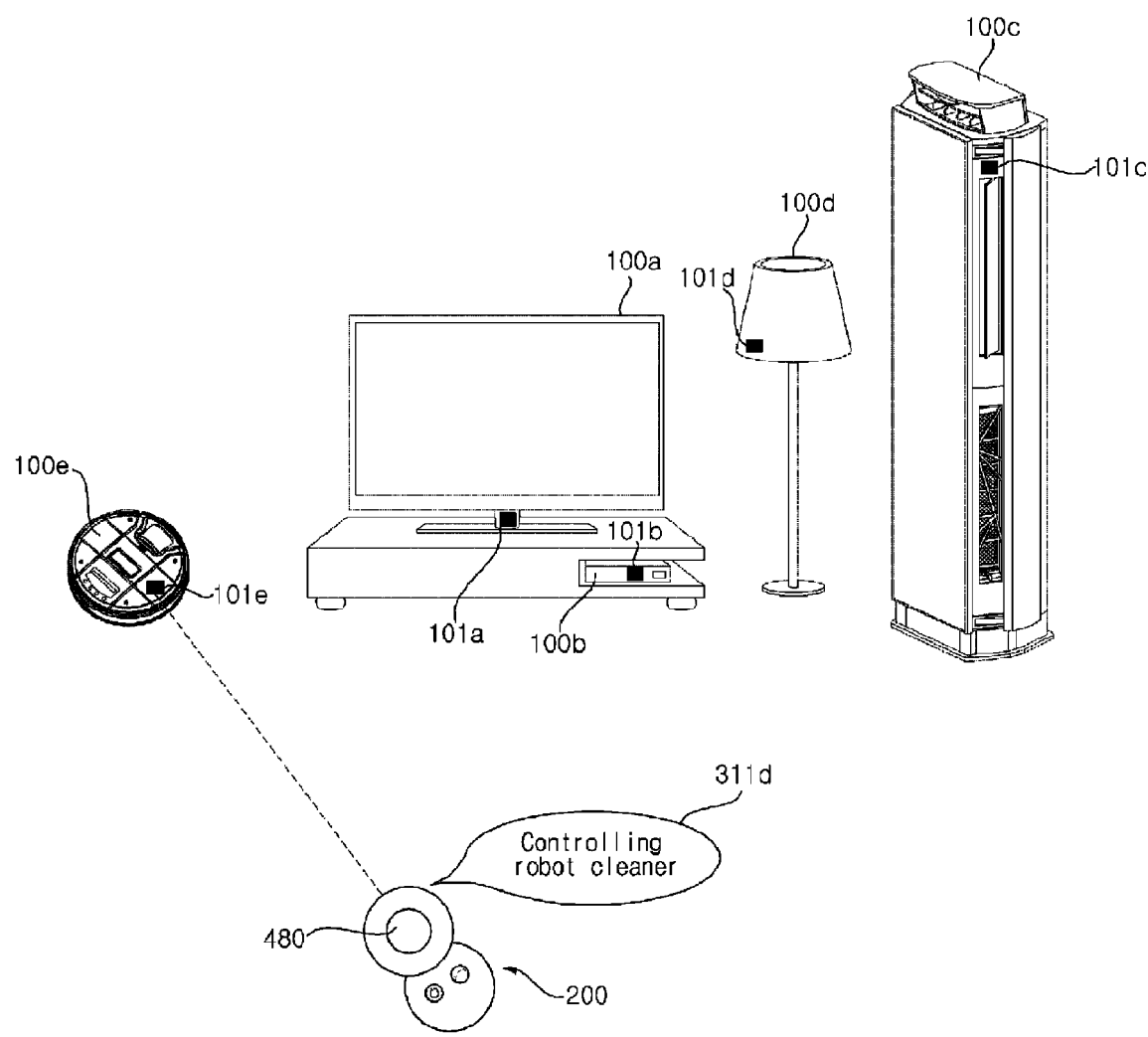

FIG. 3D illustrates a case where the remote controller 200 is oriented toward the robot cleaner 100e among various devices 100a, 100b, 100c, 100d, and 100e in the home.

The remote controller 200 receives a reflective signal from the reflection pattern 101d corresponding to the robot cleaner 100e.

Then, the remote controller 200 may detect device identification information from at least one reflective signal including the identification signal received from the robot cleaner 100e, and may recognize or identify the robot cleaner 100e as a remotely controllable device, based on the detected device identification information. For details of recognition of the robot cleaner 100e, refer to the description of FIG. 3A.

After the remote controller 200 recognizes the robot cleaner 100e as the device toward which the remote controller 200 is oriented, the remote controller 200 may control a remote control window for the robot cleaner 100e to be projected outward.

Figure 3E:
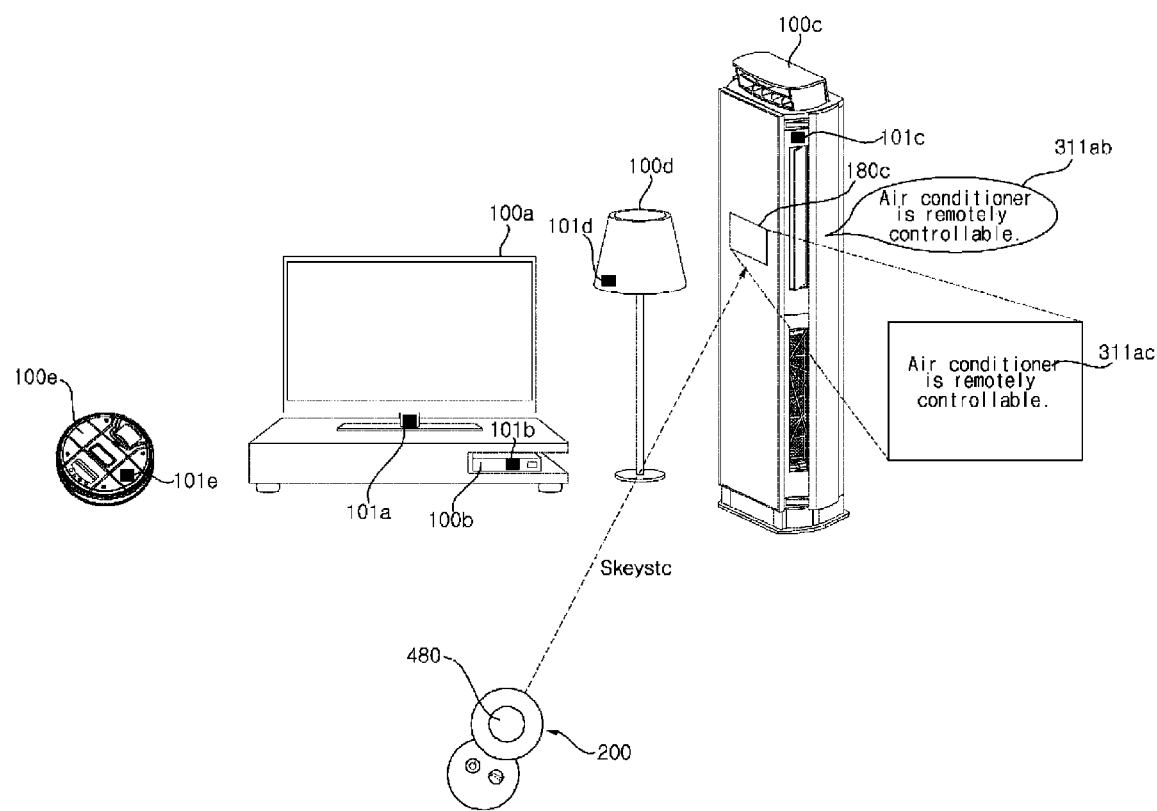

FIG. 3E illustrates transmission of a remote control signal (Skeystc) from the remote controller 200 to the air conditioner 100c when configuration for control of the air conditioner 100c is established.

After receiving the remote control signal (Skeystc), the air conditioner 100c may display an air conditioner remote control enabled message 311ac by projecting the message onto the main body of the air conditioner, or output sound corresponding to the air conditioner remote control enabled message 311ab.

That is, in contrast with FIG. 3A, the remote controller 200 does not output an air-conditioner controllable message 311a such as "Controlling the air conditioner." Instead, a remote control signal (Skeystc) may be transmitted to the air conditioner 100c, and the air conditioner 100c may output air conditioner remote control enabled messages 311ab and 311ac.

Figure 3F:
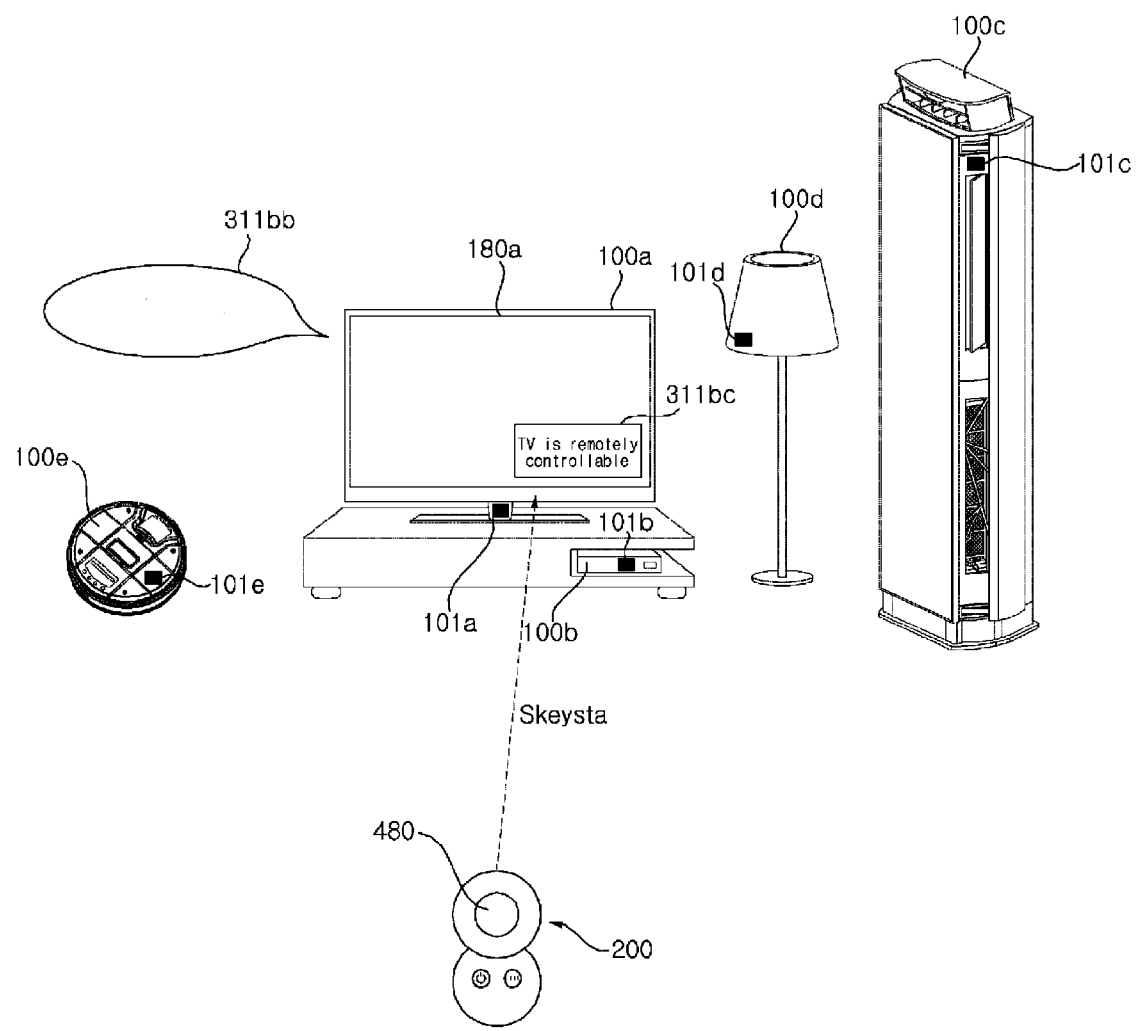

FIG. 3F illustrates transmission of a remote control signal (Skeysta) from the remote controller 200 to the present display device 100*a* when configuration for control of the image display device 100*a* is established.

After receiving the remote control signal (Skeysta), the image display device 100*a* may display an image display device remotely controllable message 311*bc* on a display 180*a*, or output sound corresponding to an image display device remote control enabled message 311*bb*.

Figure 4:
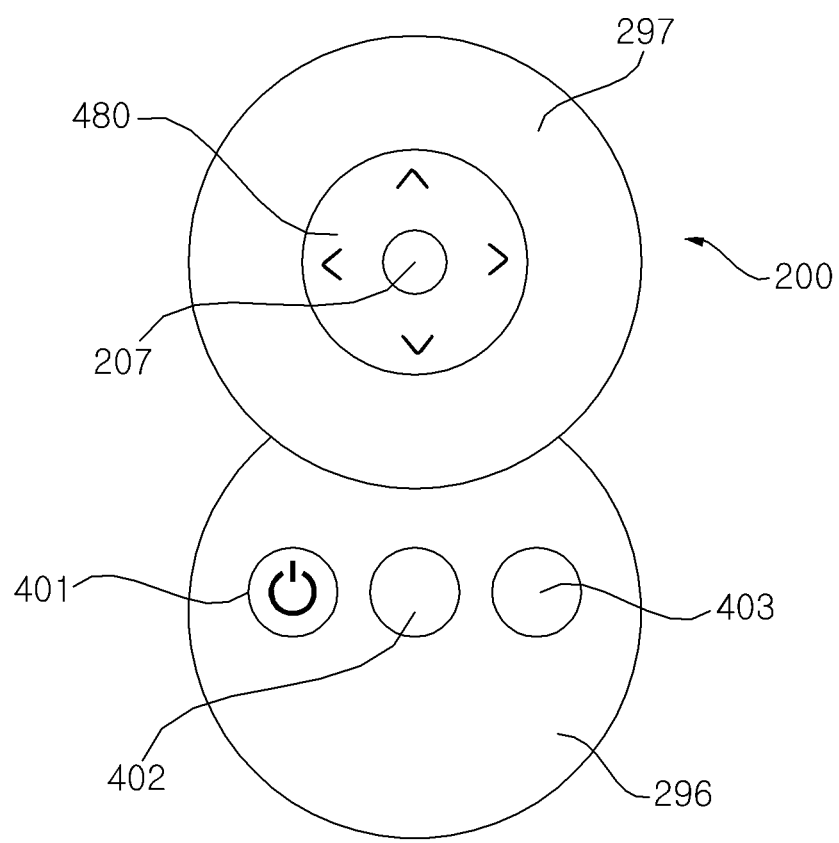
FIG. 4 illustrates the exterior of the remote controller of FIG. 1.

FIG. 4 illustrates the exterior of the remote controller of FIG. 1.

FIG. 4 illustrates displaying a display 480 in an upper case 297 of a remote controller according to an embodiment of the present invention.

FIG. 4 illustrates a case where the slide type upper case 297 is moved upward according to upward manipulation performed while a lower case 296 is fixed.

The lower case 296 may include a power button 401 related to power on/off, a first button 402 related to image projection, and a second button 403 related to item selection or condition fulfillment.

Figure 7:
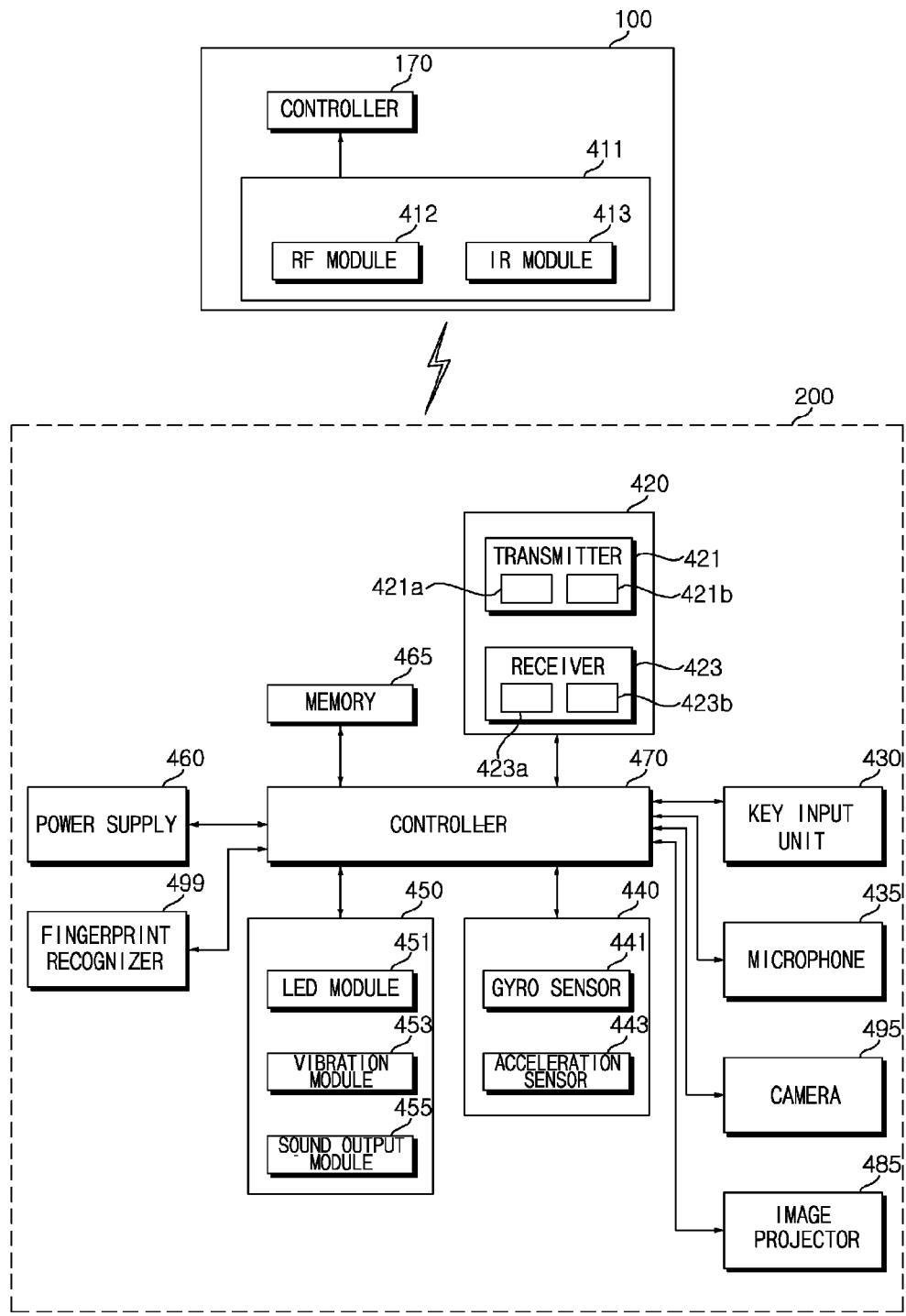
FIG. 7 is an internal block diagram illustrating the remote controller of FIG. 1.

The power button 401, the first button 402 and the second button 403 may be included in a key input unit 430 (see FIG. 7).

As shown in FIG. 4, when the upper case 297 and the lower case 296 are spaced apart from each other, the remote controller 200 may be activated.

Figure 5:
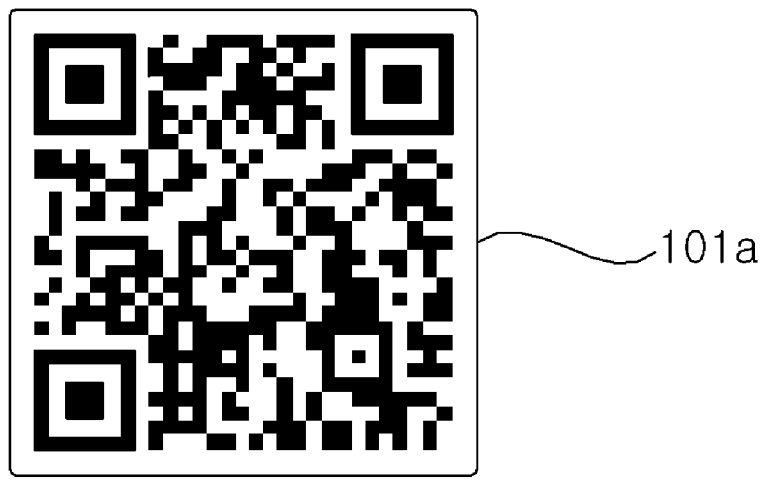
FIG. 5 is a view illustrating an exemplary reflection pattern.

FIG. 5 is a view illustrating an exemplary reflection pattern 101*a*.

Referring to FIG. 5, the reflection pattern 101*a* is preferably an IR pattern.

Figure 6:
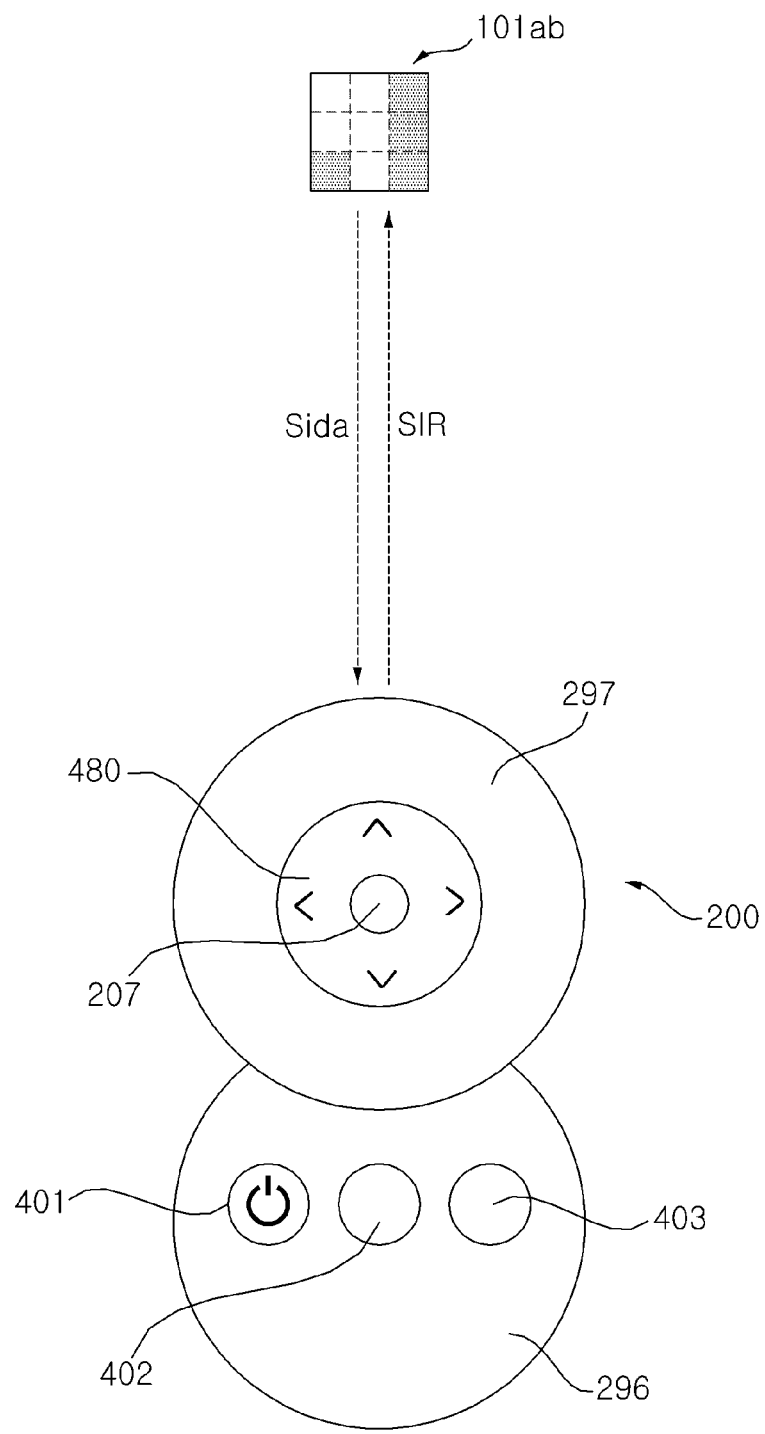
FIG. 6 is a view illustrating a reflective signal output using a reflection pattern.

FIG. 6 is a view illustrating reflective signal output using a reflection pattern.

Referring to FIG. 6, the reflection pattern 101*ab* is an IR pattern having a size of 3×3. A reflective material may be applied to a part of the 3×3 region.

For example, if a transmitting signal SIR is an IR signal, the reflection pattern 101*ab* may output a reflective signal Sida corresponding to the transmitting signal SIR.

The size and pattern of the reflective signal Sida may depend on the shape of the reflection pattern 101*ab*. Thereby, the remote controller 200 may identify a device corresponding to the reflection pattern 101*ab*.

FIG. 7 is an internal block diagram illustrating the remote controller of FIG. 1.

Referring to FIG. 7, the remote controller 200 may include a wireless communication unit 420, a key input unit 430, a microphone 435, a sensor unit 440, an output unit 450, a power supply 460, a memory 465, a controller 470, a display 480, a camera 495, and an image projector 485.

The wireless communication unit 420 may communicate signals with one of the devices described above. To this end, the wireless communication unit 420 may include a receiver 423 and a transmitter 421.

In this embodiment, the remote controller 200 may include the receiver 423 for receiving a device reflective signal and the transmitter 421 for outputting a remote control signal, an output signal or a call signal.

The transmitter 421 may output a transmitting signal, which is one of an infrared (IR) signal, a radio frequency (RF) signal, a Wi-Fi signal, a ZigBee signal, a Bluetooth signal, a laser signal and an ultra wideband (UWB) signal.

The transmitter 421 may output a remote control signal, which is one of an IR signal, a radio frequency (RF) signal, a Wi-Fi signal, a ZigBee signal, a Bluetooth signal, a laser signal and an ultra wideband (UWB) signal.

For example, the transmitter 421 may include an IR module 421*a* and output an IR signal-based transmitting signal. The transmitter 421 may output an IR signal-based remote control signal.

The transmitter 421 may include an RF module 421*b*, and output an RF-based remote control signal.

The receiver 423 may receive, from the reflection pattern 101, a reflective signal, which is one of an infrared (IR) signal, a radio frequency (RF) signal, a Wi-Fi signal, a ZigBee signal, a Bluetooth signal, a laser signal and an ultra wideband (UWB) signal.

When the device is the image display device 100*a*, the remote controller 200 may transmit a signal containing pointing information of the remote controller 200, for example, information about movement of the remote controller 200.

The key input unit 430 may include a plurality of keys. The plurality of keys may be implemented by a keypad, buttons, the touchpad, a touchscreen, or the like.

The microphone 435 may receive a voice of the user, convert the received voice into an electrical signal, and deliver the electrical signal to the controller 470.

The sensor unit 440 may sense acceleration information and rotational angle information corresponding to movement of the remote controller 200.

To this end, the sensor unit 440 may include a gyro sensor 441 or an acceleration sensor 443. The gyro sensor 441 and the acceleration sensor 443 may sense information about movement of the remote controller 200.

For example, the gyro sensor 441 may sense information about movement of the remote controller 200 with respect to X, Y and Z axes. The acceleration sensor 443 may sense information about the movement speed of the remote controller 200.

The output unit 450 may output vibration or a sound signal corresponding to manipulation of the key input unit 430, or emit light corresponding to the manipulation through an LED. The user may recognize, through the output unit 450, whether the key input unit 430 is manipulated.

For example, the output unit 450 may include an LED module 451 which is lit when the key input unit 43 is manipulated or an IR signal is transmitted or received through the wireless accommodation unit 425, a vibration module 453 for generating vibration, and a sound output module 455 for outputting sound.

The power supply 460 supplies power to the remote controller 200. The power supply 460 interrupts power applied to the remote controller 200 if the remote controller 200 does not make a movement for a predetermined time. Thereby, the power supply 460 may reduce power consumption. The power supply 460 may resume supply of power to the remote controller 200 when a predetermined key provided to the remote controller 200 is manipulated.

Various kinds of programs and application data necessary for control or operation of the remote controller 200 may be stored in the memory 465.

Particularly, the memory 465 may store received signals and reflection patterns corresponding to the received signals according to respective devices.

The controller 470 controls overall operations related to control of the remote controller 200.

When the controller 470 receives, from at least one device or a reflection pattern corresponding to the device, at least one reflective signal including a device reflective signal through the receiver 423, the controller 470 may detect the reflective signal from the at least one received reflective signal, recognize or identify a device based on the detected reflective signal, and match at least one of the keys with a control command for remote control of the device. If a key matched with the control command is selected, the controller 470 may control the transmitter 421 to output a remote control signal corresponding to the control command.

When the remote controller is oriented toward the device, the controller 470 may identify the device based on the reflective signal received from the device or a reflection pattern corresponding to the device.

When the remote controller 200 is oriented toward a first device, the controller 470 may detect a first reflective signal in at least one reflective signal including the first reflective signal received from a first reflection pattern of the first device, control the remote controller 200 to enter a remote control mode for the first device corresponding to the first reflection pattern based on the detected first reflective signal, and control the image projector 485 to project a remote control window for remote control of the first device outward.

Herein, the remote control window may include a plurality of items for remote control of the first device.

The controller 470 may change items in the remote control window according to a recognized device.

When a predetermined item in the remote control window is selected, the controller 470 may control the wireless communication unit 425 to transmit a remote control signal corresponding to the selected item to the device.

The receiver 423 may receive information about the first device from the gateway 400. The controller 470 may perform a control operation to enter a remote control mode for the first device corresponding to the first reflection pattern, based on information about the first device received via the gateway 400, and control the image projector 485 to project a remote control window for remote control of the first device outward.

The controller 470 may control the image projector 485 to project a pointer in addition to the remote control window. If the first item in the remote control window is selected by the pointer, the controller 470 may perform a control operation to output a first remote control signal corresponding to the first item.

The controller 470 may control the image projector 485 to project the pointer according to operation of a first button in the input unit.

If a second button in the input unit is operated with the pointer positioned on the first item in the remote control window, the controller 470 may perform a control operation to select the first item and output a first remote control signal corresponding to the first item.

The controller 470 may calculate the position of the pointer with respect to the first reflection pattern based on the sensing information from the sensor unit. If the second button in the input unit is operated while the pointer is positioned on the first item in the remote control window, the controller 470 may perform a control operation to select the first item and output the first remote control signal corresponding to the first item.

The controller and 470 may control the remote control window to be projected based on the first reflection pattern.

The controller 470 may perform a control operation to display the remote control window in a projectable region onto which the remote control window can be projected such that the remote control window is projected based on the first reflection pattern.

The controller 470 may control the remote control window to be projected onto a fixed position in the projectable region with respect to the first reflection pattern even if the orientation of the image projector 485 changes due to hand trembling.

In displaying the pointer, the controller 470 may control the pointer to be positioned in a first area of the projectable region.

The controller 470 may perform a control operation to change the magnification ratio of the projected remote control window according to an input for adjusting the distance from the first reflection pattern or the magnification ratio.

The controller 470 may detect the position of the first reflection pattern based on the received light. The controller 470 may calculate the position of the pointer with respect to the first reflection pattern based on the sensing information from the sensor unit. If the second button in the input unit is operated while the pointer is positioned on the first item in the remote control window according to the calculation, the controller 470 may perform a control operation to select the first item and output the first remote control signal corresponding to the first item.

The controller 470 may detect the position of the first reflection pattern and the position of the pointer based on the received light. If the second button in the input unit is operated while the pointer is positioned on the first item in the remote control window according to the detection, the controller 470 may perform a control operation to select the first item and output the first remote control signal corresponding to the first item.

According to another embodiment of the present invention, the controller 470 may control an image related to the first reflection pattern to be projected outward based on a reflective signal from the first reflection pattern.

The controller 470 may control the image projector 485 to project a pointer in addition to the image according to operation of the first button in the input unit.

The controller 470 may perform a control operation to display the image in a projectable region onto which the remote control window can be projected such that the image is projected based on the first reflection pattern.

In displaying the pointer, the controller 470 may control the pointer to be positioned in a first area of the projectable region.

Meanwhile, the camera 495 may capture an image. Particularly, when the camera 495 is oriented toward the face of a user, the camera 495 may capture an image containing the face of the user.

The controller 470 may identify or recognize the user based on the captured user face image and restored data related to user images.

The image projector 485 may output a projected image outward. To this end, a laser diode having good directionality may be employed as a light source.

The image projector 485 may include a light source unit 210 (see FIG. 8) for outputting visible light corresponding to the projected image. In order to adjust the output direction, output angle and output distance of the projected image, the image projector 485 may include a scanner 240 (see FIG. 8) for outputting visible light outward in a scanning manner.

The image projector 485 may perform a control operation to display a remote control window in a projectable region onto which the remote control window can be projected such that the remote control window is projected based on the first reflection pattern.

The image projector 485 may output a pointer in addition to the image.

The image projector 485 may project the remote control window to a fixed position in the projectable region with respect to the first reflection pattern even if the orientation of the image projector 485 changes due to hand trembling.

The image projector 485 may project the remote control window with the magnification ratio thereof changed according to an input for adjusting the distance from the first reflection pattern or the magnification ratio.

The device 100 may include a wireless communication unit 411 for wirelessly transmitting and receiving signals to and from the remote controller 200, and a controller 170 for operation control corresponding to a received radio signal.

The wireless communication unit 411 may wirelessly transmit and receive signals to and from the remote controller 200. In addition, the wireless communication unit 411 may receive a signal which is transmitted by the remote controller 200 according to various communication standards.

Figure 8:
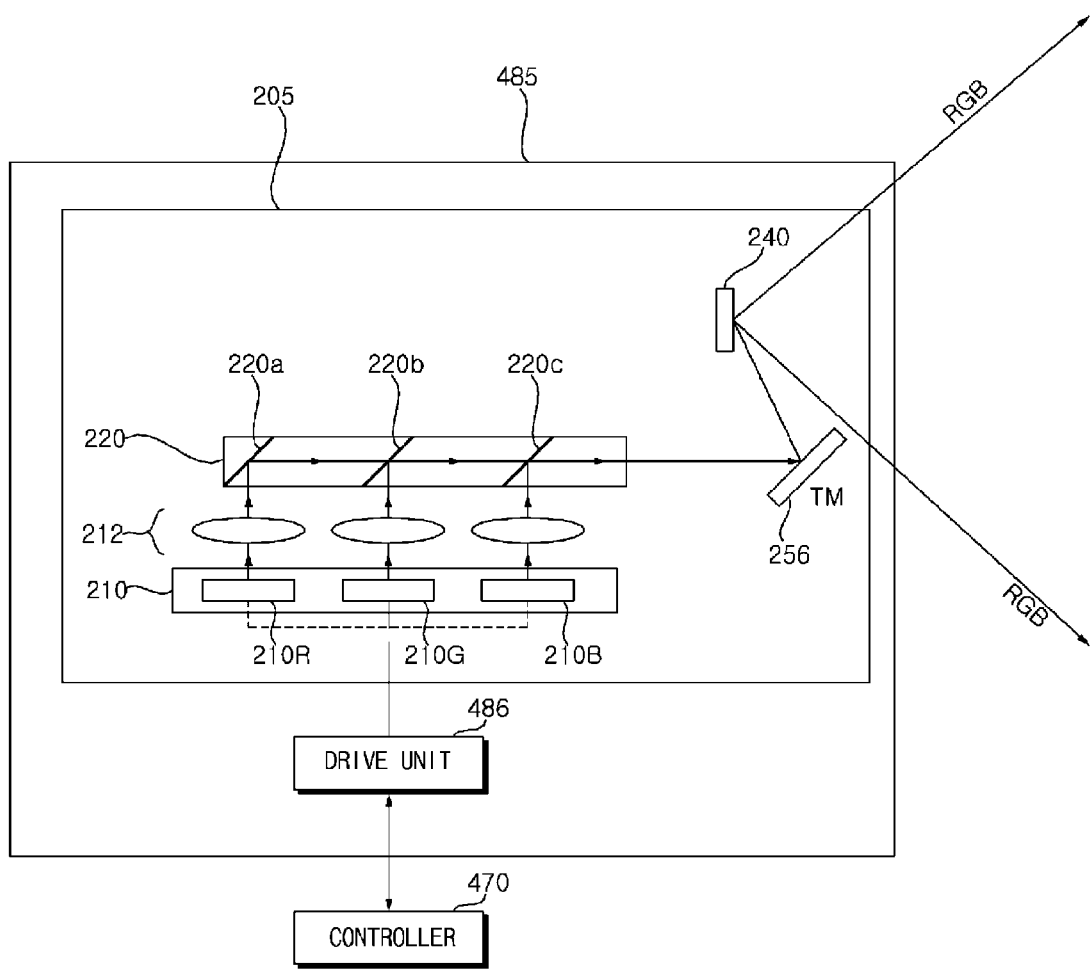
FIG. 8 is an internal block diagram illustrating the image projector of FIG. 6.

FIG. 8 is an internal block diagram illustrating the image projector of FIG. 6.

Referring to FIG. 8, the image projector 485 may include an optical unit 205 and a drive unit 186.

The optical unit 205 may include a light source unit 210 provided with a plurality of light sources. That is, the optical unit 205 may include a red light source unit 210R, a green light source unit 210G, and a blue light source unit 210B. The red light source unit 210R, the green light source unit 210G, and the blue light source unit 210B may be provided with a red light source, a green light source and a blue light source, respectively. For example, each light source may include a laser diode.

Each of the light source units 210R, 210G and 210B may be driven by an electrical signal from the drive unit 185. The electrical symbol of the drive unit 185 may be generated according to control of the controller 470.

The red light, green light and blue light output from the light source units 210R, 210G and 210B are collimated through respective collimator lens included in a collimation unit 212.

An optical synthesizer 220 synthesizes rays of light output from the respective light source units 210R, 210G and 210B and outputs synthesized light in one direction. To this end, the optical synthesizer 220 may include three 2D MEMS mirrors 220a, 220b and 220c.

That is, a first optical synthesizer 220a, a second optical synthesizer 220b and a third optical synthesizer 220c may output, toward a scanner 240, the red light output from the red light source unit 210R, the green light output from the green light source unit 210G and the blue light output from the blue light source unit 210B.

An optical reflector 256 reflects, toward the scanner 240, red light, green light and blue light transmitted through the optical synthesizer 220. The optical reflector 256 reflects light of various wavelengths. To this end, the optical reflector 256 may be implemented by a total mirror (TM).

The scanner 240 may receive visible light RGB, which is based on the red light, green light and blue light, from the light source unit 210, and sequentially and repeatedly perform first direction scanning and second direction scanning outward. The scanning operation is repeatedly performed throughout an external scanning region. Thereby, a projected image corresponding to the visible light RGB may be displayed.

Figure 9:
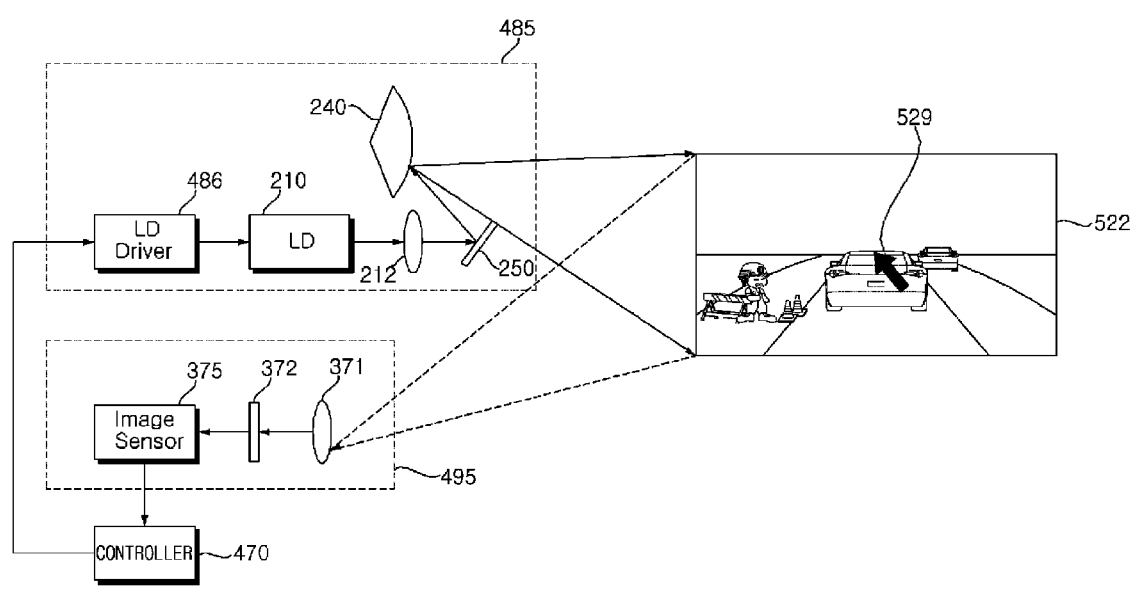
FIG. 9 is an internal block diagram illustrating the image projector and the camera of FIG. 6.

FIG. 9 is an internal block diagram illustrating the image projector and the camera of FIG. 6.

Referring to FIG. 9, the image projector 485 may include a laser diode drive unit 486, a first light source 210, a collimator lens (CL) 212, a mirror 250, and the scanner 240.

The laser diode drive unit 486 may perform a control operation to drive, based on a drive signal from the controller 470, the first light source 210 for outputting infrared light or structured infrared light. Particularly, intensity of the infrared light or structured infrared light may be adjusted by the level and pulse width of the drive signal.

The infrared light output from the first light source 210 is incident on the mirror 250 via the CL 212. The mirror 250 changes the light path of the infrared light or structured infrared light to deliver the infrared light or structured infrared light to the scanner 240.

The scanner 240 receives the infrared light or structured infrared light, performs the first direction scanning and the second direction scanning, and outputs infrared light or structured infrared light to an external region.

Particularly, the scanner 214 may output the infrared light (IR) or structured IR with respect to the front 522.

The controller 470 may control the scanner 240. Specifically, the controller 470 may adjust the angles of the first direction scanning and the second direction scanning of the scanner. The direction in which IR light is output may be changed by adjusting the scanning angles.

In addition, the controller 470 may change the scanning frequency of the scanner 240. When the controller 470 reduces the scanning frequency from 60 MHz to 30 MHz, the scanning operation may be performed in the same external region with an increased resolution. Accordingly, more specific distance information may be acquired.

The camera 495 may receive received light (IR) corresponding to IR light.

The camera 495 may include a collimating lens (CL) 371 for receiving and collimating received light, an IR pass filter 372, and a light detector 374, for example, a time-of-flight (TOF) sensor 375 for converting the received light having passed through the IR pass filter into an electrical signal. The converted electrical signal from the TOF sensor 375 may be input to the controller 470.

The IR pass filter 372, which is designed to allow IR light to pass therethrough and block light of other wavelengths, may be optionally provided.

While FIGS. 8 and 9 illustrate the scanner 240 for a projected image and the scanner 240 for outputting IR light, a scanner may be commonly used to output a projected image and IR light.

That is, the image projector 485 of FIG. 8 and an object sensor 20 of FIG. 9 may be implemented by one module, and may share a scanner.

In addition, the image projector 485 of FIGS. 8 and 9 may output a visible light-based projected image and IR-based outputting light simultaneously or sequentially.

The camera 495 may not only detect IR-based received light but also visible light-based received light.

If a pointer 529 is displayed in a projected image 522 as shown in FIG. 9, the controller 470 may detect the pointer 529 based on a visible light-based image captured by the camera 495, particularly, the position and distance of the pointer.

Alternatively, the controller 470 may detect the pointer 529 based on the IR-based received light received from the camera 495. Particularly, the controller 470 may detect the position and distance of the pointer.

Figure 10:
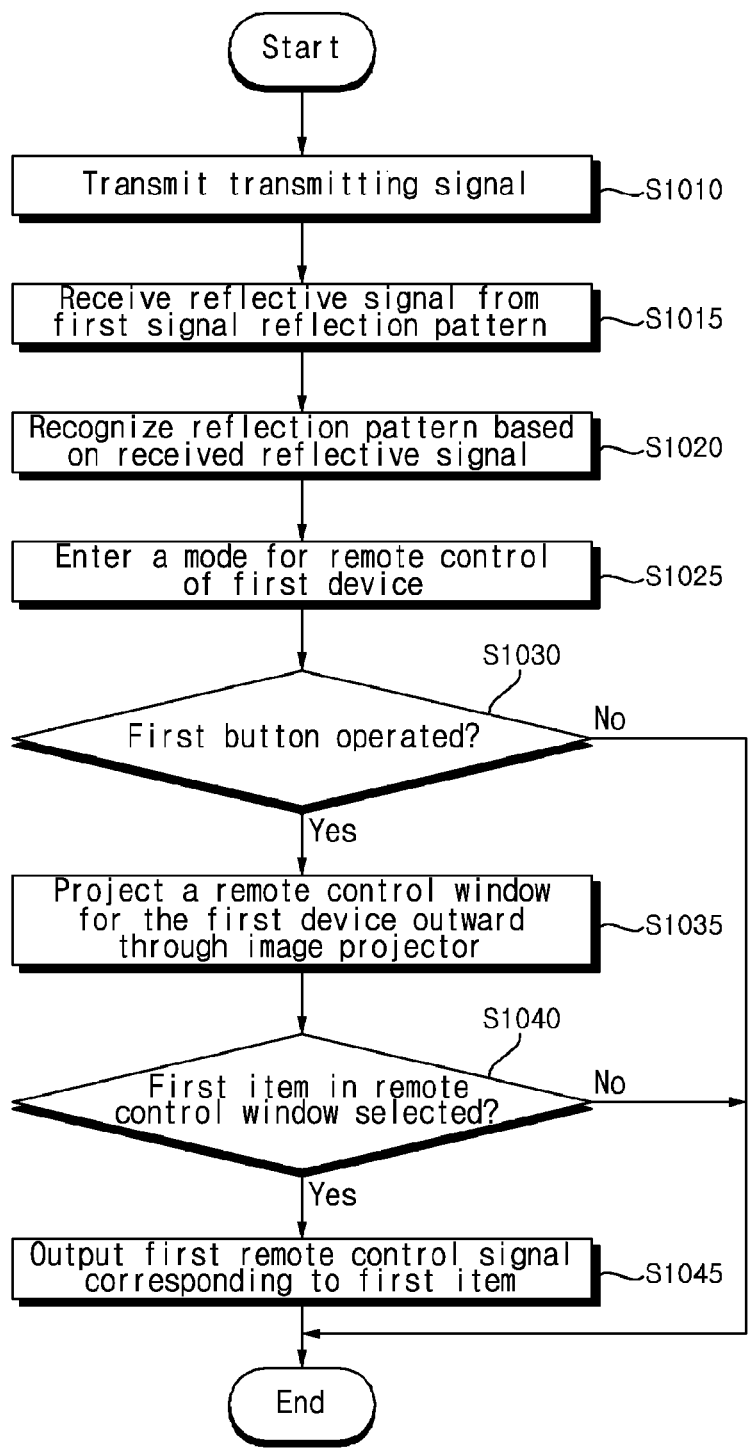
FIG. 10 is a flowchart illustrating a method for operating a remote controller according to an embodiment of the present invention.

FIG. 10 is a flowchart illustrating a method for operating a remote controller according to an embodiment of the present invention. FIGS. 11A to 13B are views illustrating the method for operating the remote controller of FIG. 10.

Referring to FIG. 10, the transmitter 421 of the remote controller 200 transmits a transmitting signal (S1010).

Figure 11A:
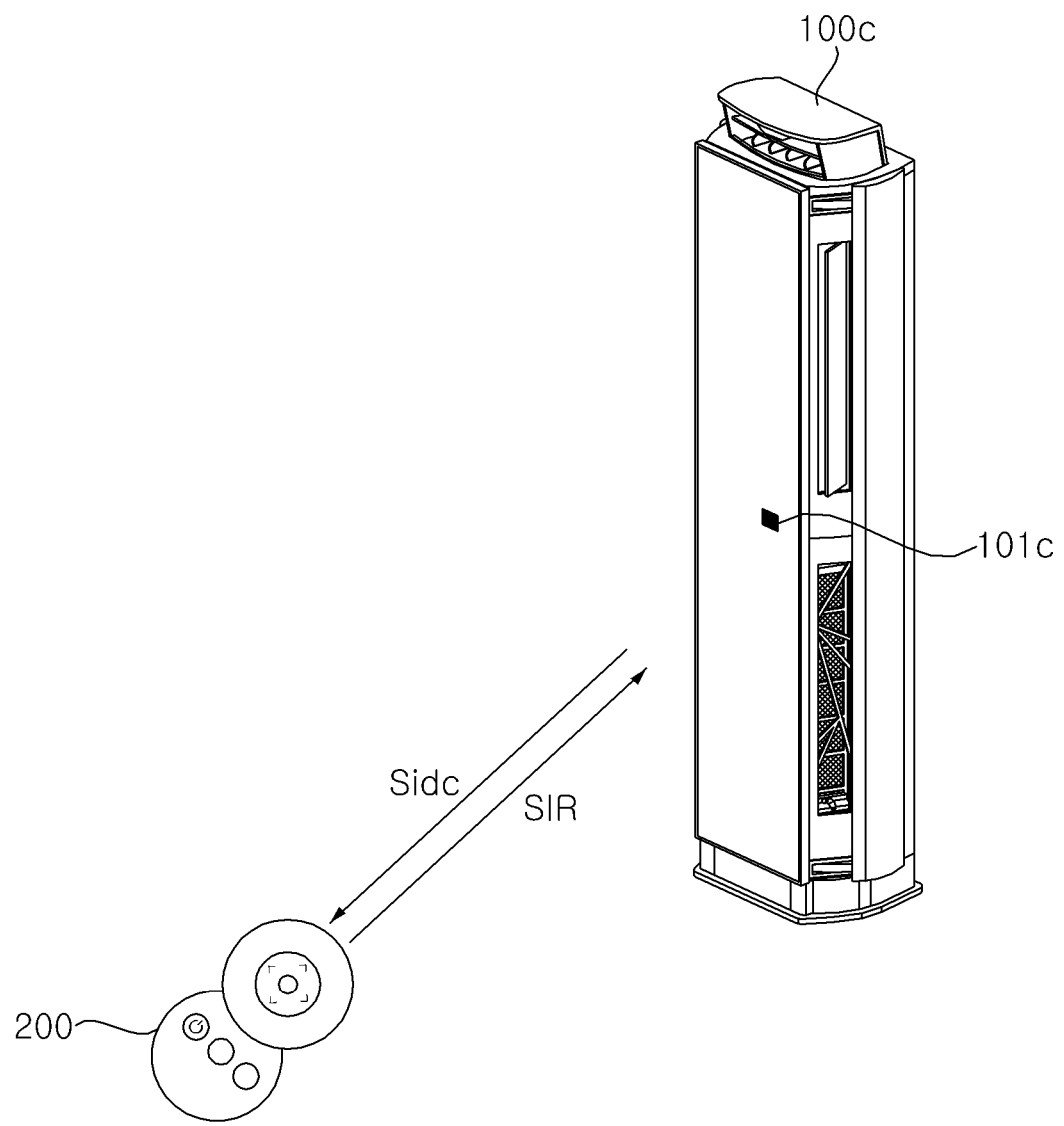
FIGS. 11A to 13B are views illustrating the method for operating the remote controller of FIG. 10.

For example, when the first reflection pattern 101c is attached to the first device 100c as shown in FIG. 11A, the remote controller 200 may transmit a transmitting signal SIR while being directed to the first the reflection pattern 101a.

After the transmitting signal SIR is incident on the first reflection pattern 101a, the first reflection pattern 101a may output a reflective signal Sidc as shown in FIG. 11A.

The receiver 423 of the remote controller 200 receives the reflective signal Sidc from the first reflection pattern 101c (S1015).

Next, the controller 470 of the remote controller 200 recognizes the reflection pattern based on the reflective signal received by the receiver 423 (S1020).

Particularly, if the reflection pattern is a pre-registered reflection pattern, the controller 470 of the remote controller 200 may recognize the reflection pattern as a reflection pattern of the air conditioner 100c, based on the reflective signal received by the receiver 423.

Next, the controller 470 of the remote controller 200 performs a control operation to enter a mode for remote control of the recognized first device (S1025).

For example, the controller 470 of the remote controller 200 may configure a remote control window for remotely controlling the air conditioner 100c.

Next, the controller 470 of the remote controller 200 determines whether a first button is operated (S1030). If the first button is determined to be operated, the controller 470 controls the image projector 485 to project the remote control window of the first device (S1035).

Figure 11B:
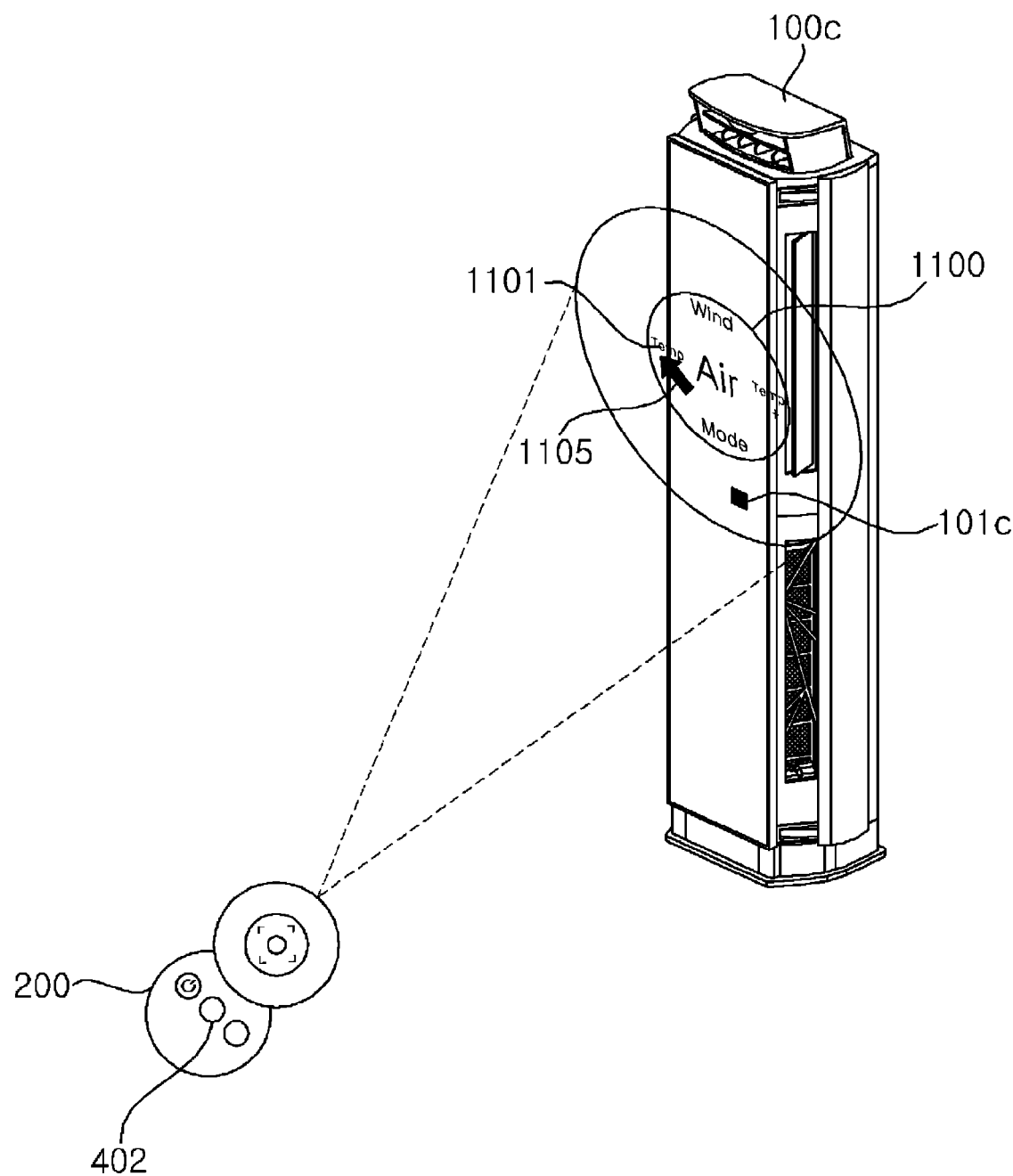

FIG. 11B illustrates projection of a remote control window 1100 for remote control of the identified air conditioner 100c onto the main body of the air conditioner 100c.

Herein, the remote control window 1100 may include a plurality of items for remote control of the first device 100c.

FIG. 11B shows a temperature adjustment item 1101, a setting item for, for example, wind intensity, and a mode setting item as examples of the plurality of items.

The controller 470 may change items in the remote control window according to recognized devices.

The controller 470 may control the remote control window 1100 to be displayed in a projectable region such that the remote control window 1100 is projected based on the first reflection pattern 101c.

The controller 470 may control the remote control window 1100 to be projected onto a fixed position in the projectable region with respect to the first reflection pattern 101c even if the orientation of the image projector 485 changes due to hand trembling.

The pointer 1105 may be projected along with the remote control window 1100.

Next, if a first item in the remote control window is selected (S1040), the controller 470 of the remote controller 200 may output a first remote control signal corresponding to the first item (S1045).

In the example of FIG. 11B, the temperature adjustment item 1101 is selected with the pointer 1105 positioned on the temperature adjustment item 1101.

If the second button 403 in the input unit 430 is operated with the pointer 1105 positioned on the first item 1101 in the remote control window 1100, the controller 470 may perform a control operation to select the first item 1101 and output the first remote control signal corresponding to the first item 1101.

The controller 470 may calculate the position of the first reflection pattern based on received light. The controller 470 may calculate the position of the pointer with respect to the first reflection pattern based on the sensing information from the sensor unit. If the second button 403 in the input unit 430 is operated with the pointer 1105 positioned on the first item 1101 in the remote control window 1100, the controller 470 may perform a control operation to select the first item 1101 and output the first remote control signal corresponding to the first item 1101.

Figure 11C:
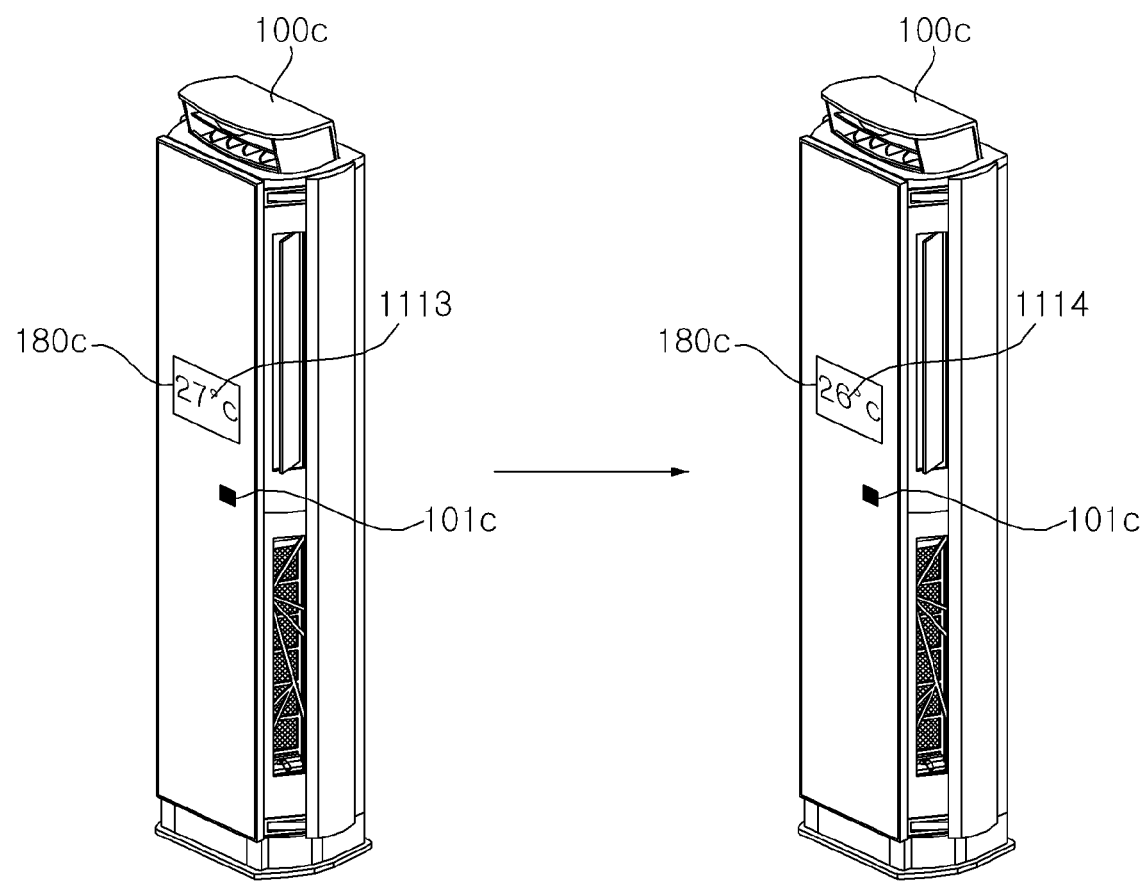

FIG. 11C illustrates lowering the temperature set in the air conditioner 100c from 27° C. to 26° C. according to selection of the temperature adjustment item 1101.

In this example, remote control may be easily performed using a projected image and a pointer. Particularly, when the remote controller 200 does not have a display, remote control of a corresponding device may be easily performed by projecting an image and a pointer outward.

Figure 12A:
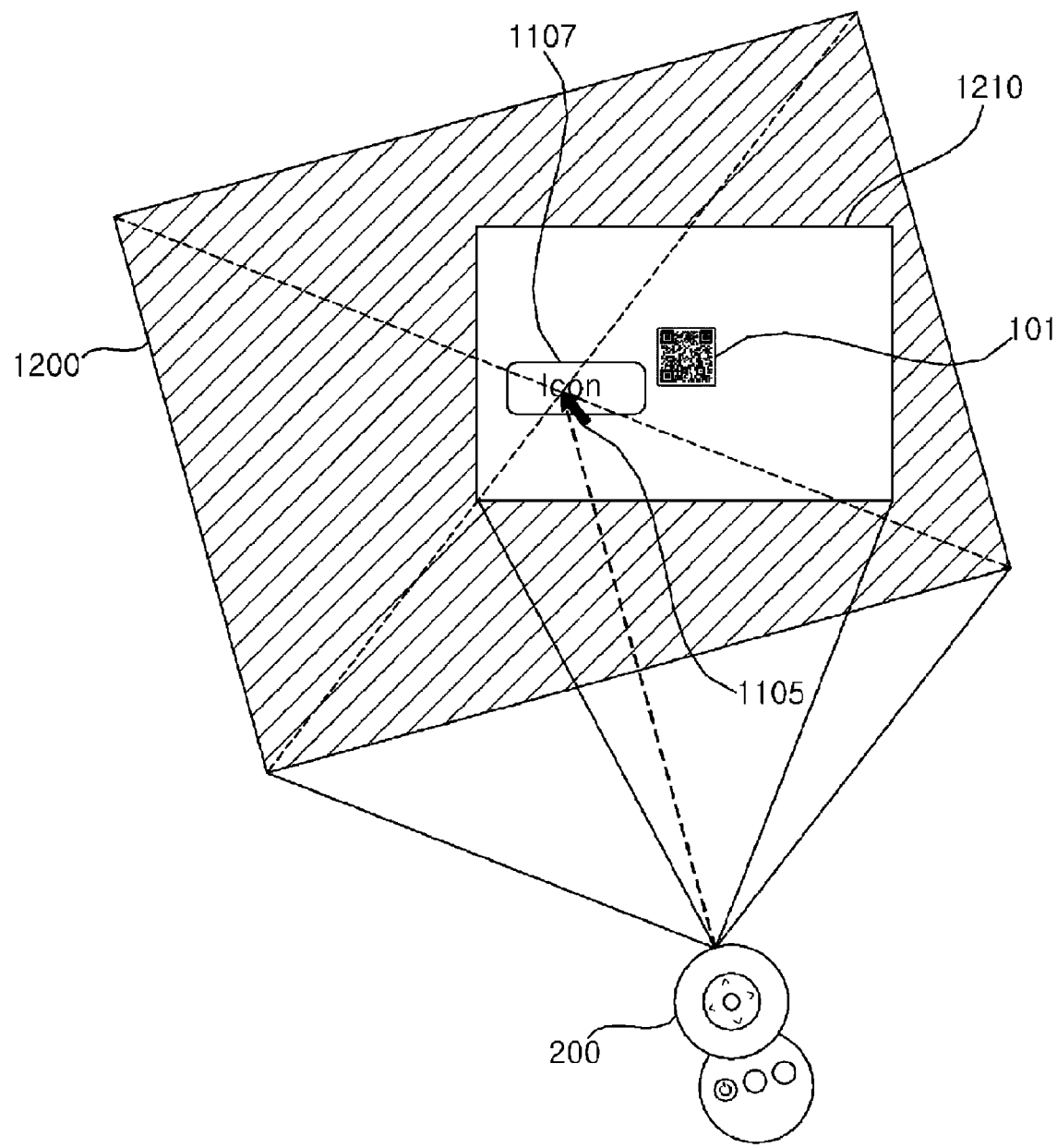

FIG. 12A illustrates displaying a remote control window 1210 within a projectable region 1200.

The controller 470 may control the remote control window 1210 to be displayed within the projectable region 1200 such that the remote control window 1210 is projected based on the first reflection pattern 101.

The controller 470 may control the remote control window 1210 to be displayed at a fixed position within the projectable region 1200 with respect to the first reflection pattern 101 even if orientation of the image projector 485 changes due to hand trembling.

In displaying the pointer, the controller 470 may control the pointer to be positioned in a first area of the projectable region 1200. Herein, the first area may be a central area of the projectable region 1200.

For example, the direction in which the image projector 485 is oriented may change according to hand trembling or hand movement with the projectable region 1200 fixed. Thereby, the display position of the remote control window 1210 in the projectable region 1200 may change.

The pointer 1105 may be displayed in the central area of the projectable region 1200 regardless of hand trembling or hand movement.

In the case where the remote control window 1210 includes a plurality of selectable items, if the pointer 1105 is positioned on a first item which is remotely controllable in the remote control window 1210 at a first time when there is no hand trembling or hand movement occurring, the controller 470 may control the first item to be selected.

In the case where the remote control window 1210 includes a plurality of selectable items, if the pointer 1105 is positioned on a second item which is selectable in the remote control window 1210 at a second time when there is hand trembling or hand movement occurring, the controller 470 may control the second item to be selected.

Thereby, a remotely controllable item desired by the user may be selected.

Figure 12B:
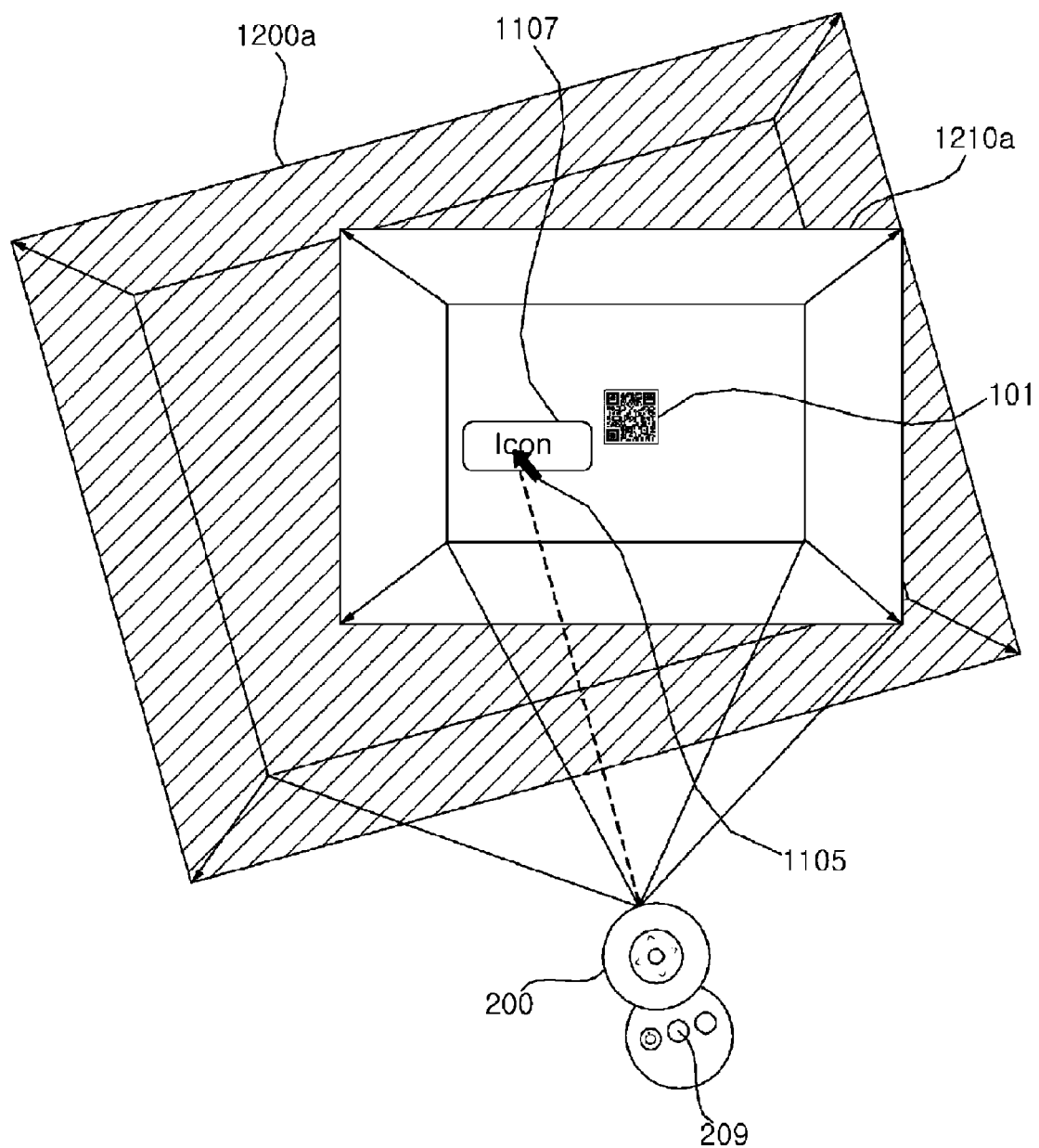

FIG. 12B illustrates displaying a remote control window 1210a in a projectable region 1200a for which the magnification ratio has been adjusted.

The controller 470 may perform a control operation to change the magnification ratio of the projected remote control window 1210a according to an input for adjusting the distance from the first reflection pattern or the magnification ratio.

In FIG. 12B, as the distance to the first reflection pattern decreases, the magnification ratio of the remote control window 1210a in the projectable region 1200a increases compared to FIG. 12A. However, embodiments of the present invention are not limited thereto.

Figure 13A:
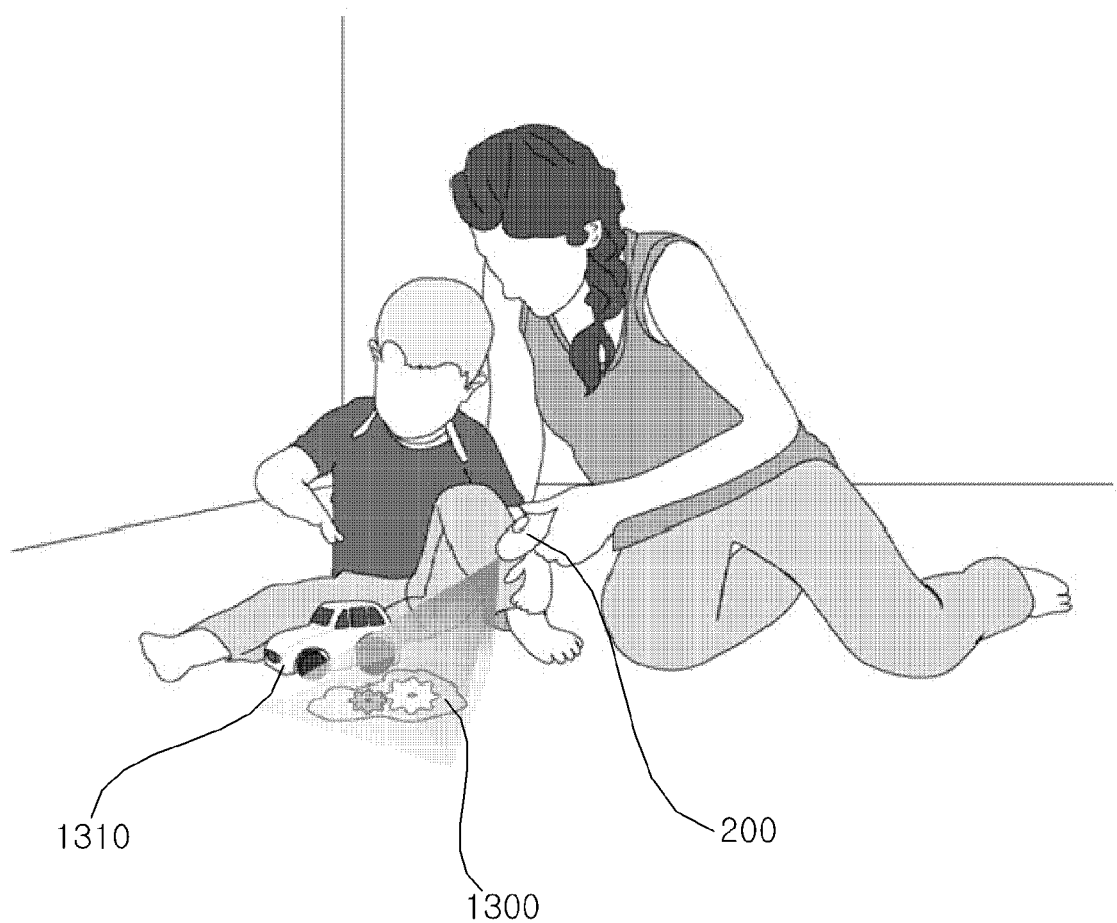
Figure 13B:
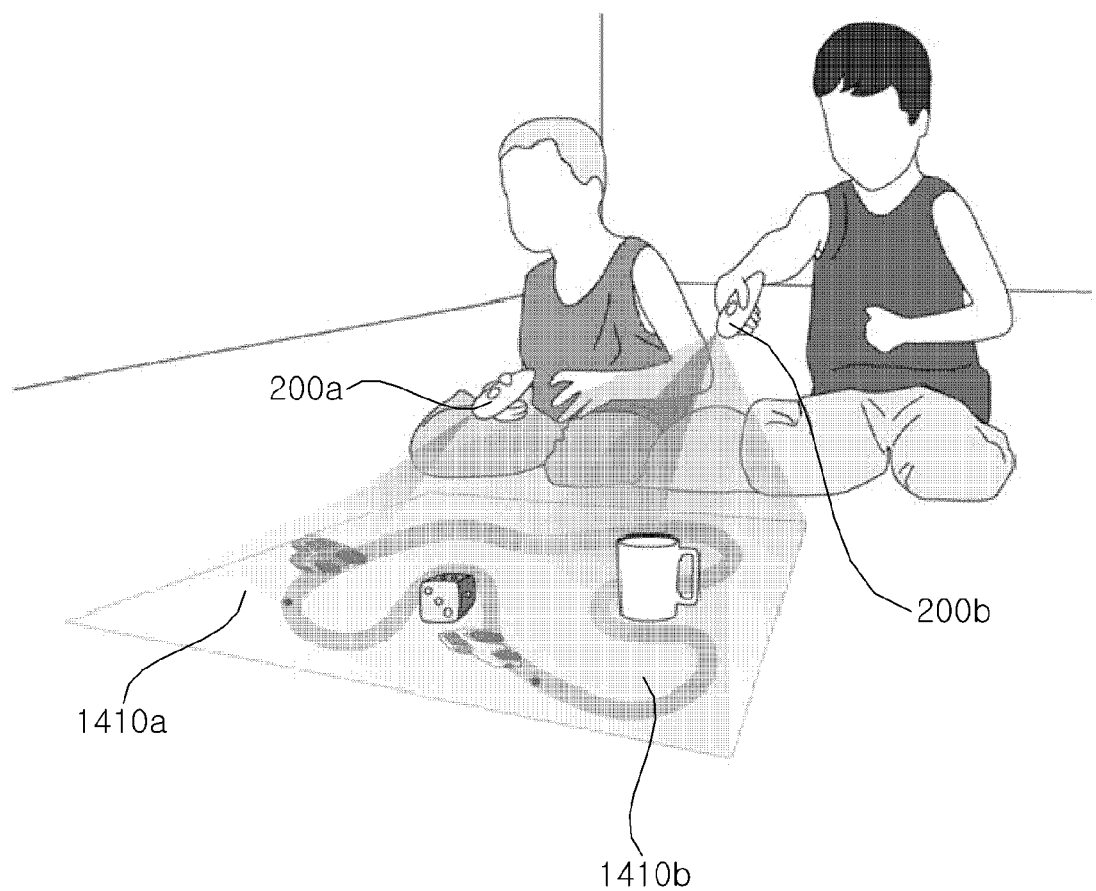

FIGS. 13A and 13B illustrate projection of various images through the remote controller 200 according to another embodiment of the present invention.

For example, if a toy 1310 has a reflection pattern attached thereto as shown in FIG. 13A, the remote controller 200 may recognize the reflection pattern and project an image 1300 related to the toy 1310 onto an area near the toy 1310. Thereby, user convenience may be enhanced.

It is also possible to project a plurality of images 1410a and 1410b using a plurality of remote controllers 200a and 200b as shown in FIG. 13B. In this case, if there is an overlapping area, a guide message for avoiding overlap may be output from at least one of the remote controllers 200a and 200b.

A method for operating the remote controller of the present invention is implementable by code readable by a processor provided to the remote controller, on a recording medium readable by the processor. The recording medium readable by the processor includes all kinds of recording devices in which data readable by the processor can be stored. Examples of the recording medium readable by the processor include ROM, RAM, CD-ROM, magnetic tape, floppy disk, and optical data storage. The method is also implementable in the form of a carrier wave such as transmission over the Internet. In addition, the recording medium readable by the processor may be distributed to computer systems connected over a network, and code which can be read by the processor in a distributed manner may be stored in the recording medium and executed.

As is apparent from the above description, the present invention has the following effects.

According to an embodiment of the present invention, a remote controller includes a transmitter to transmit a transmitting signal, a receiver to receive a reflective signal from a first reflection pattern, an image projector to project an image outward, an input unit provided with a plurality of buttons, and a controller for performing a control operation, based on the reflective signal from the first reflection pattern, to enter a remote control mode for a first device corresponding to the first reflection pattern and controlling the image projector to project a remote control window for remote control of the first device outward. Thereby, remote control may be performed based on image projection.

Particularly, by protecting a remote control window for remotely controlling the first device corresponding to the first reflection pattern outward, remote control may be easily performed using the remote control window.

As a pointer separate from the remote control window is displayed, an item in the remote control window may be easily selected using the pointer.

The image projector may be implemented in a compact size by outputting visible light in a scanning manner.

The image projector further includes an optical output unit and an optical receiver for detecting a distance in addition to the remote control window. The position of the first reflection pattern may be detected based on received light, and the position of the pointer with respect to the first reflection pattern may be calculated based on the sensing information from the sensor unit. Thereby, a first item in the remote control window may be selected.

According to another embodiment of the present invention, a remote controller includes a transmitter to transmit a transmitting signal, a receiver to receive a reflective signal from a first reflection pattern, an image projector to project an image, an input unit provided with a plurality of buttons, and a controller for performing a control operation based on the reflective signal from the first reflection pattern to project an image related to the first reflection pattern outward. Thereby, images may be output based image projection.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A remote controller comprising:
   a transmitter to transmit a transmitting signal;
   a receiver to receive a reflective signal from a first reflection pattern;
   an image projector to project an image outward;
   an input unit provided with a plurality of buttons; and
   a controller to perform a control operation to enter a remote control mode for a first device corresponding to the first reflection pattern based on the reflective signal from the first reflection pattern and to perform a control operation to project a remote control window for remote control of the first device outward through the image projector.

2. The remote controller according to claim 1, wherein, when a first item in the remote control window is selected, the controller performs a control operation to output a first remote control signal corresponding to the first item.

3. The remote controller according to claim 1, wherein the controller controls the image projector to project a pointer in addition to the remote control window,
   wherein, when a first item in the remote control window is selected by the pointer, the controller performs a control operation to output a first remote control signal corresponding to the first item.

4. The remote controller according to claim 3, wherein the controller controls the image projector to project the pointer according to operation of a first button in the input unit.

5. The remote controller according to claim 3, wherein, when a second button in the input unit is operated with the pointer positioned on the first item in the remote control window, the controller performs a control operation to select the first item and output the first remote control signal corresponding to the first item.

6. The remote controller according to claim 3, further comprising:
   a sensor unit to sense acceleration information and rotational angle information,
   wherein the controller calculates a position of the pointer with respect to the first reflection pattern based on sensing information from the sensor unit, and when a second button in the input unit is operated with the calculation indicating that the pointer is positioned on the first item in the remote control window, performs a control operation to select the first item and output the first remote control signal corresponding to the first item.

7. The remote controller according to claim 1, wherein the controller controls the remote control window to be projected based on the first reflection pattern.

8. The remote controller according to claim 1, wherein the controller controls the remote control window to be displayed in a projectable region such that the remote control window is projected based on the first reflection pattern.

9. The remote controller according to claim 8, wherein the controller controls the remote control window to be projected onto a fixed position in the projectable region with respect to the first reflection pattern even if an orientation of the image projector changes due to hand trembling.

10. The remote controller according to claim 8, wherein the controller controls pointer to be positioned in a first area in the projectable region in displaying the pointer.

11. The remote controller according to claim 8, wherein the controller performs a control operation to change a magnification ratio of the projected remote control window according to an input for adjustment of a distance to the first reflection pattern or the magnification ratio.

12. The remote controller according to claim 1, wherein the image projector comprises:
   a light source unit to output visible light corresponding to the projected image; and
   a scanner to output the visible light outward in a scanning manner.

13. The remote controller according to claim 1, wherein the image projector comprises:
   a light source unit to output visible light corresponding to the projected image; and
   a scanner to output the visible light outward in a scanning manner,
   wherein the scanner outputs the outputting light and the visible light outward in a scanning manner,
   wherein the controller detects a distance to an external object based on the outputting light and received light corresponding to the outputting light.

14. The remote controller according to claim 13, further comprising:
   a sensor unit to sense acceleration information and rotational angle information,
   wherein the controller controls the image projector to project a pointer in addition to the remote control window,
   wherein the controller detects a position of the first reflection pattern based on the received light,
   wherein the controller calculates a position of the pointer with respect to the first reflection pattern based on sensing information from the sensor unit, and when a second button in the input unit is operated with the calculation indicating that the pointer is positioned on the first item in the remote control window, performs a control operation to select the first item and output the first remote control signal corresponding to the first item.

15. The remote controller according to claim 13, wherein the controller controls the image projector to project a pointer in addition to the remote control window,
   wherein the controller detects a position of the first reflection pattern and a position of the pointer based on the received light,
   wherein, when a second button in the input unit is operated with the pointer positioned on the first item in the remote control window, the controller performs a control operation to select the first item and output the first remote control signal corresponding to the first item.

16. A remote controller comprising:
   a transmitter to transmit a transmitting signal;
   a receiver to receive a reflective signal from a first reflection pattern;
   an image projector to project an image outward;
   an input unit provided with a plurality of buttons; and
   a controller for performing a control operation to project an image related to the first reflection pattern outward based on the reflective signal from the first reflection pattern.

17. The remote controller according to claim 16, wherein the controller controls the image projector to project a pointer according to operation of a first button in the input unit, in addition to the image.

18. The remote controller according to claim 16, wherein the controller controls the image to be displayed in a projectable region such that the image is projected based on the first reflection pattern.

19. The remote controller according to claim 18, wherein the controller controls the image to be projected onto a fixed position in the projectable region with respect to the first reflection pattern even if an orientation of the image projector changes due to hand trembling.

20. The remote controller according to claim 18, wherein the controller controls the pointer to be positioned in a first area in the projectable region in displaying the pointer.

* * * * *